(12) United States Patent
Nishi

(10) Patent No.: US 8,274,898 B2
(45) Date of Patent: Sep. 25, 2012

(54) COMMUNICATION ROUTE PRESUMPTION TECHNIQUE

(75) Inventor: Tetsuya Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 12/696,346

(22) Filed: Jan. 29, 2010

(65) Prior Publication Data

US 2010/0254397 A1 Oct. 7, 2010

(30) Foreign Application Priority Data

Apr. 7, 2009 (JP) ................................ 2009-092787

(51) Int. Cl.
*H04L 12/26* (2006.01)
(52) U.S. Cl. ...................................................... 370/241
(58) Field of Classification Search .................. 370/241, 370/242–245, 248, 250–253, 400, 401; 709/224, 709/229, 232, 238
See application file for complete search history.

(56) References Cited

U.S. PATENT DOCUMENTS

| 7,773,536 | B2 * | 8/2010 | Lloyd et al. | 370/252 |
| 8,036,121 | B2 * | 10/2011 | Kobayashi | 370/232 |
| 8,064,466 | B2 * | 11/2011 | Nishi | 370/400 |
| 8,135,824 | B2 * | 3/2012 | Saha et al. | 709/224 |
| 2001/0032272 | A1 | 10/2001 | Fujita | |

FOREIGN PATENT DOCUMENTS

| JP | 2005-236881 | 9/2005 |
| JP | 2005-252368 | 9/2005 |
| JP | 2006-33235 | 2/2006 |

* cited by examiner

*Primary Examiner* — Dmitry H Levitan
(74) *Attorney, Agent, or Firm* — Katten Muchin Rosenman LLP

(57) ABSTRACT

A method includes: identifying a test source address (SA) in a second network and a test destination address (DA) in a third network, wherein a packet is presumed to be transmitted from the second network to the third network through plural communication routes in a first network; causing an output edge router connected to the third network to change settings of an ARP table in the output edge router so as not to transfer the packet addressed to the test DA to the third network; obtaining the first number of input packets from each counting router on each route; transmitting a test packet including the test SA and DA, plural times; obtaining the second number of input packets from each counting router; calculating a difference between the first and second numbers for each route; and identifying a route through which the test packets passed, based on the differences.

6 Claims, 19 Drawing Sheets

| SOURCE SUBNET | DESTINATION SUBNET | COMMUNICATION ROUTE |
|---|---|---|
| 12.0.0.0/8 | 11.0.0.0/8 | G→B→C |
| 11.0.0.0/8 | 10.0.0.0/8 | C→D→H |
| 12.0.0.0/8 | 10.0.0.0/8 | G→A→E→N1→D→H |
| | | G→B→C→D→H |

FIG.3

| ROUTE TO BE MEASURED | NO. OF INPUT PACKETS BEFORE TEST PACKET TRANSMISSION | NO. OF INPUT PACKETS AFTER TEST PACKET TRANSMISSION |
|---|---|---|
| A | 3 | 3 |
| B | 2 | 1002 |

FIG.5

| SOURCE ADDRESS (modulo N) | DESTINATION ADDRESS (modulo N) | ROUTE ID |
|---|---|---|
| 0 | 0 | ... |
| 0 | 1 | ... |
| 0 | 2 | ... |
| ... | ... | ... |
| 0 | N−1 | ... |
| 1 | 0 | ... |
| 1 | 1 | ... |
| ... | ... | ... |
| N−1 | 0 | ... |
| N−1 | 1 | ... |
| ... | ... | ... |
| N−1 | N−1 | ... |

N × N ENTRIES

FIG.6

| SOURCE ADDRESS | DESTINATION ADDRESS | ROUTE ID |
|---|---|---|
| 12.0.0.3 | 10.0.0.3 | 2 |
| 12.0.0.3 | 10.0.0.4 | 1 |
| 12.0.0.4 | 10.0.0.3 | 1 |
| 12.0.0.4 | 10.0.0.4 | 2 |
| ⋮ | ⋮ | ⋮ |

N × N RECORDS

FIG.7

| SOURCE ADDRESS (modulo N) | DESTINATION ADDRESS (modulo N) | ROUTE ID |
|---|---|---|
| 0 | 0 | |
| 0 | 1 | |
| 1 | 0 | |
| 1 | 1 | |

FIG.9

COUNT TABLE
(SRC=12.0.0.3, DST=10.0.0.3)

| ROUTER TO BE MEASURED | NO. OF INPUT PACKETS BEFORE TEST PACKET TRANSMISSION | NO. OF INPUT PACKETS AFTER TEST PACKET TRANSMISSION |
|---|---|---|
| A | 2 | 2 |
| B | 3 | 1003 |

FIG.12

COUNT TABLE
(SRC=12.0.0.3, DST=10.0.0.4)

| ROUTER TO BE MEASURED | NO. OF INPUT PACKETS BEFORE TEST PACKET TRANSMISSION | NO. OF INPUT PACKETS AFTER TEST PACKET TRANSMISSION |
|---|---|---|
| A | 2 | 1002 |
| B | 5 | 5 |

FIG.14

| etherStatsUndersizePkts | NO. OF RECEIVED PACKETS WHOSE SIZE IS LESS THAN 64 BYTES |
|---|---|
| etherStatsOversizePkts | NO. OF RECEIVED PACKETS WHOSE SIZE IS GREATER THAN 1518 BYTES |
| etherStatsPkts64Octets | NO. OF RECEIVED PACKETS WHOSE SIZE IS EQUAL TO 64 BYTES |
| etherStatsPkts65to127Octets | NO. OF RECEIVED PACKETS WHOSE SIZE IS FROM 65 TO 127 BYTES |
| etherStatsPkts128to255Octets | NO. OF RECEIVED PACKETS WHOSE SIZE IS FROM 128 TO 255 BYTES |
| etherStatsPkts256to511Octets | NO. OF RECEIVED PACKETS WHOSE SIZE IS FROM 256 TO 511 BYTES |
| etherStatsPkts512to1023Octets | NO. OF RECEIVED PACKETS WHOSE SIZE IS FROM 512 TO 1023 BYTES |
| etherStatsPkts1024to1518Octets | NO. OF RECEIVED PACKETS WHOSE SIZE IS FROM 1024 TO 1518 BYTES |

FIG.11

[TEST RESULT TABLE]

| | SOURCE ADDRESS | DESTINATION ADDRESS | ROUTE ID |
|---|---|---|---|
| 1901 | 12.0.0.3 | 10.0.0.3 | 2 |
| 1902 | 12.0.0.3 | 10.0.0.4 | 1 |
| 1903 | 12.0.0.4 | 10.0.0.3 | 1 |
| 1904 | 12.0.0.4 | 10.0.0.4 | 2 |

MAPPING

[ROUTE PRESUMPTION TABLE]

| | SOURCE ADDRESS (modulo N) | DESTINATION ADDRESS (modulo N) | ROUTE ID |
|---|---|---|---|
| 1911 | 0 | 0 | 2 |
| 1912 | 0 | 1 | 1 |
| 1913 | 1 | 0 | 1 |
| 1914 | 1 | 1 | 2 |

FIG.19

COUNT TABLE
(SRC=12.0.0.4, DST=10.0.0.3)

| ROUTER TO BE MEASURED | NO. OF INPUT PACKETS BEFORE TEST PACKET TRANSMISSION | NO. OF INPUT PACKETS AFTER TEST PACKET TRANSMISSION |
|---|---|---|
| A | 2 | 1002 |
| B | 2 | 2 |

COUNT TABLE
(SRC=12.0.0.4, DST=10.0.0.4)

| ROUTER TO BE MEASURED | NO. OF INPUT PACKETS BEFORE TEST PACKET TRANSMISSION | NO. OF INPUT PACKETS AFTER TEST PACKET TRANSMISSION |
|---|---|---|
| A | 3 | 3 |
| B | 4 | 1004 |

IP HEADER [20 BYTES]

UDP HEADER

COMMUNICATION ROUTE PRESUMPTION TECHNIQUE

CROSS-REFERENCE TO RELATED APPLICATIONS

This application is based upon and claims the benefit of priority of the prior Japanese Patent Application No. 2009-092787, filed on Apr. 7, 2009, the entire contents of which are incorporated herein by reference.

FIELD

This technique relates to a technique for presuming a communication route of packets flowing in a network.

BACKGROUND

FIG. 27 depicts an example of an Internet Protocol (IP) network. In such a network, it is important to identify the communication route on the network because of the following reasons, for example. Specifically, first, as depicted in FIG. 28, this is because it is necessary to identify a route at which the failure occurs, when loss of packets occurs. Second, this is because it is necessary to confirm whether or not the communication route is a route assumed at the network design. Third, this is because it is necessary to confirm whether or not packets are bypathed so as not to affect the service, when the maintenance work or the like is carried out.

By the way, Open Shortest Path First (OSPF) protocol is frequently used for the routing control in the IP network. In OSPF, the respective network apparatuses (e.g. routers) exchange packets called Link State Advertisement (LSA), and generates and holds a topology and routing table.

Conventionally, a route monitoring server to capture packets flowing in a network is provided for the network in which the routing by OSPF is carried out, in order to identify the communication route in the network by collecting LSA. For example, in FIG. 27, the route monitoring server captures packets flowing in a router E, and generates and holds the same topology and same routing table as that in the router.

On the other hand, in OSPF, when there are plural communication routes (called Equal Cost Multi-Path (ECMP)) having the same cost to a certain destination, the load can be distributed to the respective communication routes. Incidentally, the allocation to the respective communication routes is carried out for each combination of the source address and destination address, for example.

For example, in the network depicted in FIG. 27, when, as the ECMP from the router G to the route H, there are a first route "router G-router A-router E-router N1-router D-router H" and a second router "router G-router B-router C-router D-router H", packets sent from "12.0.0.0/8" to "10.0.0.0/8" are transmitted through the first and second routes, distributively. Here, the route monitoring server can identify the first and second routes from the routing table.

However, because the allocation to the respective communication routes is carried out for each combination of the source address and destination address, the route monitoring server cannot identify, from the routing table, which route the packets pass through.

Specifically, it is impossible for conventional arts to identify the communication route of the packets in a server that monitors the network when there are plural communication routes through which the packets are presumed to pass in the network.

SUMMARY

According to an aspect of this technique, a method for presuming a communication route in a first network connecting to second and third networks includes: identifying a test source address among unused addresses in the second network and a test destination address among unused addresses in the third network, wherein a packet is presumed to be transmitted from the second network to the third network through a plurality of communication routes in the first network; causing an output edge router that is an edge router connected to the third network and provided at a boundary of the first network to change settings of an Address Resolution Protocol table of the output edge router so as not to transfer a packet addressed to the test destination address to the third network; obtaining, as a first number of input packets, a value of an input packet counter from each of routers to be monitored on each of the plurality of communication routes; generating a test packet including, as a source routing, an address of an input edge router that is an edge router connected to the second network, and including, as source and destination addresses, the test source address and the test destination address, and transmitting the generated test packet a predetermined number of times; obtaining, as a second number of input packets, a value of the input packet counter from each of the routers to be monitored; calculating a difference between the first number of input packets and the second number of input packets for each of the plurality of communication routes; and identifying a communication route through which the test packets passed, based on the calculated differences.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram depicting a table example of a routing table;

FIG. 5 is a diagram depicting a table example of a count table;

FIG. 6 is a diagram depicting a table example of a route presumption table;

FIG. 7 is a diagram depicting a table example of a test result table;

FIG. 9 is a diagram depicting an example of the route presumption table in a case where the number of communication routes is "2";

FIG. 11 is a diagram depicting a counter included in RMON MIB information;

FIG. 12 is a diagram depicting the number of input packets before and after the test packet transmission (SRC=12.0.0.3, DST=10.0.0.3);

FIG. 14 is a diagram depicting the number of input packets before and after the test packet transmission (SRC=12.0.0.3, DST=10.0.0.4);

FIG. 19 is a diagram to explain a processing to register a route ID into the route presumption table;

DESCRIPTION OF EMBODIMENTS

Figure 1:
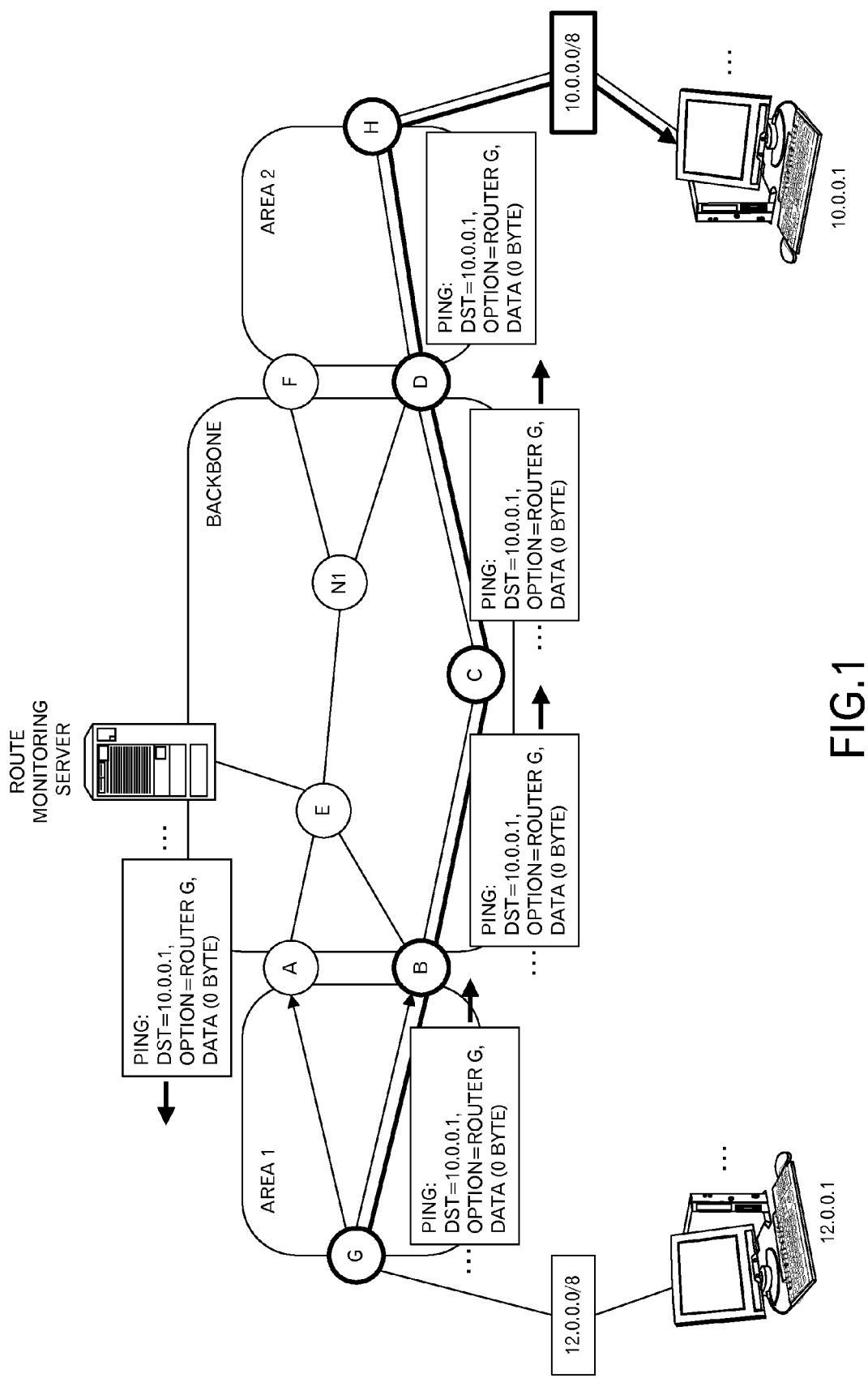
FIG. 1 is a diagram to explain a basis of an embodiment.

For example, FIG. 1 depicts one method for identifying a communication route of each packet in a route monitoring server to monitor the network when, in the network, there are plural communication routes through which packets are presumed to pass. Incidentally, in FIG. 1, it is assumed that, as ECMP from the router G to the router H, there are a first route "router G-router A-router E-router N1-router D-router H" and a second route "router G-router B-router C-router D-router H".

First, the route monitoring server identifies one combination to be checked, among combinations of an address in a source subnet ("12.0.0.0/8" in FIG. 1) and an address in a destination subnet ("10.0.0.0/8" in FIG. 1). For example, it is assumed that a combination of "12.0.0.1" and "10.0.0.1" is identified. Then, the route monitoring server generates a Packet INternet Groper (ping) packet including, as a source address (SRC), "12.0.0.1" and also including, as a destination address (DST), "10.0.0.1", and sends the generated packet as a test packet the predetermined number of times (e.g. 1000 times). At this time, the route monitoring server sets an address of the router G as the source routing into an option field of the IP header of the ping packet in order to cause the test packet to pass through the router G.

Then, the route monitoring server calculates, for each of the routers A and B, for example, a difference between the number of input packets before the test packet transmission and the number of input packets after the test packet transmission, and identifies a router whose calculated difference is equal to or close to the number of transmission times of the test packet (e.g. 1000 times). As a result, the route monitoring server identifies a route including the identified router as a communication route of a packet from "12.0.0.1" to "10.0.0.1". By carrying out this processing for all combinations of the addresses in the source subnet and the addresses in the destination subnet, it is possible to identify the individual packet communication routes.

However, according to this method, a lot of test packets are sent to a user terminal or server in the destination subnet, too much load may be imposed to the user terminal or server in the destination subnet. Incidentally, when the ping packet as the test packet is sent, too much load may also be imposed to the user terminal or server in the source subnet because the user terminal or server in the destination subnet, which received the ping packets, sends back response packets.

Then, in this embodiment, the test packet including, as the source and destination addresses, unused address in the source subnet and unused address in the destination subnet is sent, and by preventing from the test packets flowing into the destination subnet, the packet communication route is identifies without imposing additional loads to the user terminal or server in an operating state in the destination subnet. In addition, by generating a route presumption table configured according to an allocation rule of the communication route, it becomes possible to presume the communication route for the packets actually transmitted. In the following, this embodiment in which the aforementioned mechanism is implemented will be explained.

Figure 2:
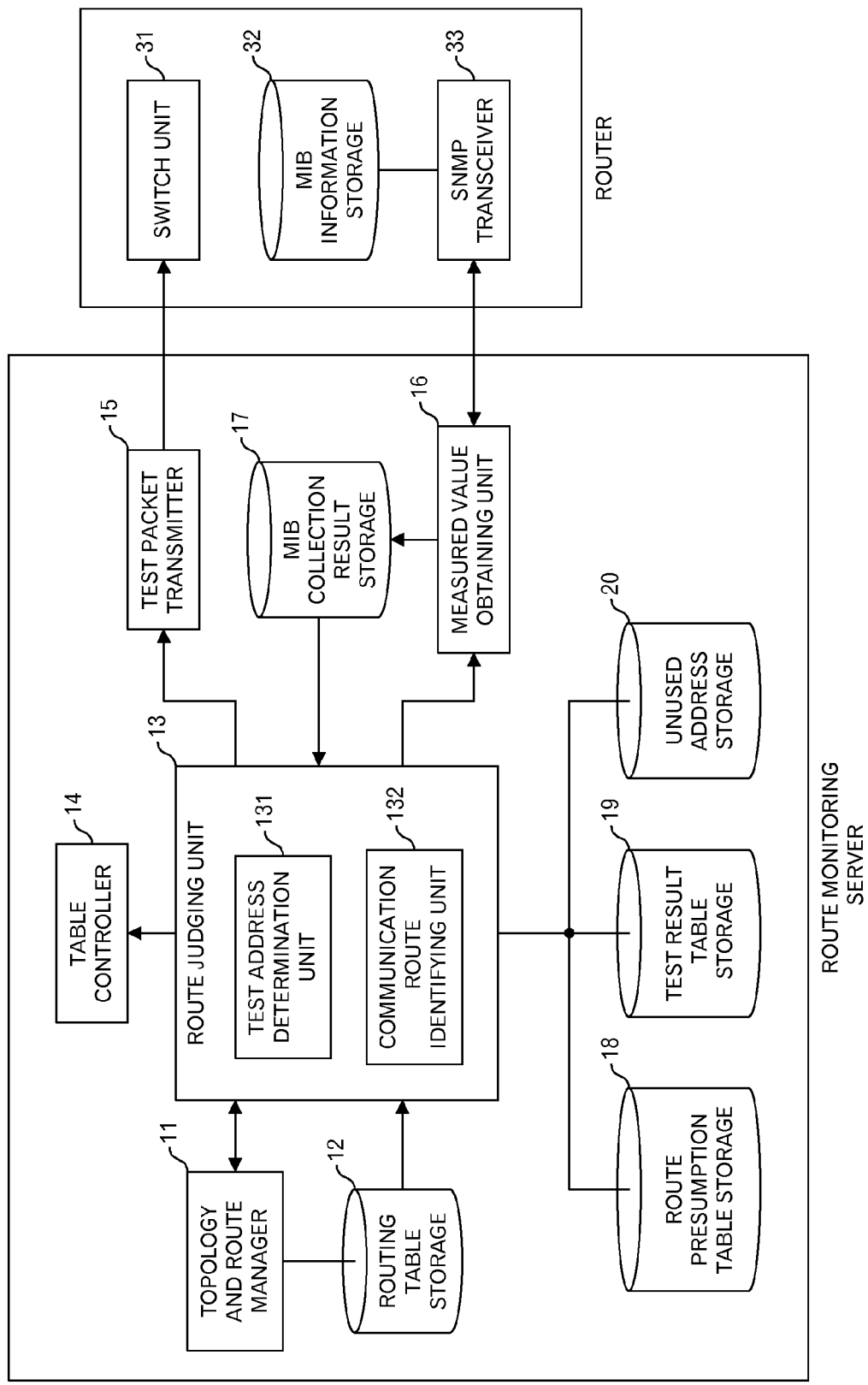
FIG. 2 is a functional block diagram of a route monitoring server and a router in the embodiment.

FIG. 2 depicts a functional block diagram of the route monitoring server and router, which relate to this embodiment of this technique. The route monitoring server has a topology and route manager 11, a routing table storage 12, a route judging unit 13, a table controller 14, a test packet transmitter 15, a measured value obtaining unit 16, a MIB collection result storage 17, a route presumption table storage 18, a test result table storage 19 and an unused address storage 20. The route judging unit 13 has a test address determination unit 131 and a communication route identifying unit 132. In addition, the router has a switch unit 31, a MIB information storage 32 and an SNMP transceiver 33.

The topology and route manager 11 collects LSA from the respective routers, generates the routing table and stores the generated routing table into the routing table storage 12, and instructs the route judging unit 13 to identify the communication route. The route judging unit 13 instructs the table controller 14 to issue a Simple Network Management Protocol (SNMP) command for causing the router to change settings of an Address Resolution Protocol (ARP) table in the router. In addition, the route judging unit 13 determines a test address according to data stored in the route presumption table storage 18 and the unused address storage 20, and instructs the test packet transmitter 15 to send the test packet. Furthermore, the route judging unit 13 instructs the measured value receiver 16 to issue an SNMP command for collecting RMON MIB information. In addition, the route judging unit 13 identifies the communication route through which the test packet passed, based on data stored in the routing table storage 12 and the MIB collection result storage 17, and stores identification information of the identified communication route into the test result table storage 19. Moreover, the route judging unit 13 registers the identification information of the communication route into the route presumption table storage 18 according to data stored in the test result table storage 19. The table controller 14 issues the SNMP command for causing the router to change settings of the ARP table to the router according to the instruction from the route judging unit 13. The test packet transmitter 15 carries out a test packet transmission processing, which will be explained later, according to the instruction from the route judging unit 13. The measured value obtaining unit 16 issues the SNMP command for collecting the RMON MIB information to the router according to the instruction from the route judging unit 13, and stores the collected RMON MIB information into the MIB collection result storage 17.

In addition, the switch unit 31 of the router is connected with other routers through transmission lines, and carries out a processing such as packet transfer according to a routing table (not depicted). The SNMP transceiver 33 transmits the RMON MIB information stored in the MIB information storage 32 to the route monitoring server in response to a request from the route monitoring server. Incidentally, functions of the router are the same as those of the conventional router, basically. Therefore, further explanation is omitted.

Figure 4:
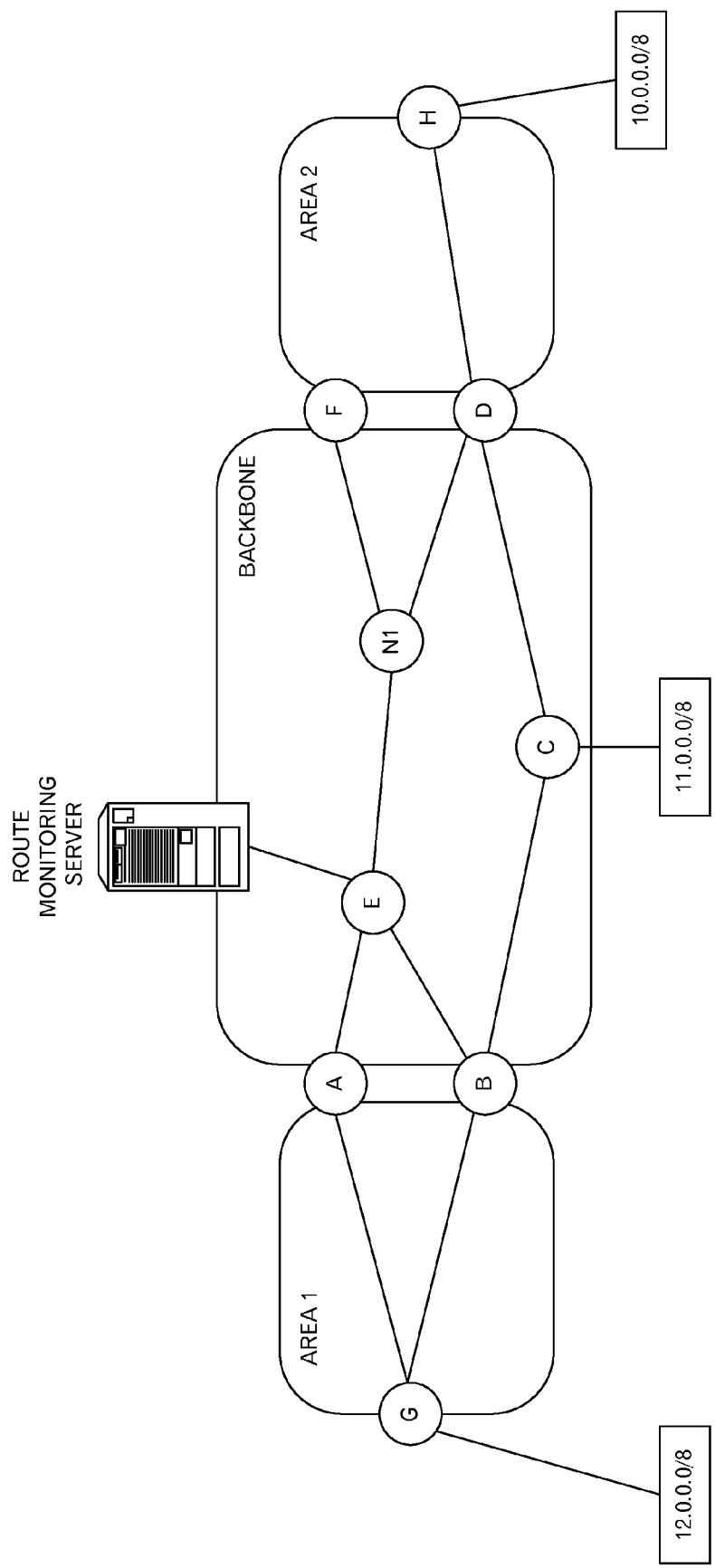
FIG. 4 is a diagram depicting a configuration example of a network.

FIG. 3 depicts an example of the routing table stored in the routing table storage 12. In the example of FIG. 3, the routing table includes a column of the source subnet, a column of the destination subnet and a column of the communication route. The identification information of one or plural communication routes through which the packets transmitted from the source subnet to the destination subnet are presumed to pass, is set to the column of the communication route. Incidentally, FIG. 3 depicts an example of the routing table in a case where the network configuration as depicted in FIG. 4 is adopted. In FIG. 4, the router G is connected with the subnet "12.0.0.0/8", the router C is connected with the subnet "11.0.0.0/8" and the router H is connected with the subnet "10.0.0.0/8". For example, in FIG. 3, two communication routes are set for the packets from "12.0.0.0/8" to "10.0.0.0/8".

FIG. 5 depicts an example of a count table stored in the MIB collection result storage 17. In the example of FIG. 5, the count table includes a column of a router to be measured (or to be monitored), a column of the number of input packets before the test packet transmission, and a column of the number of input packets after the test packet transmission.

FIG. 6 depicts an example of the route presumption table stored in the route presumption table storage 18. In the example of FIG. 6, the route presumption table includes a column of the source address (modulo N), a column of the destination address (modulo N) and a column of the route identifier (ID). Incidentally, a residue when the final byte of the source address is divided by N is set to the column of the source address (modulo N). Similarly, a residue when the final byte of the destination address is divided by N is set to the column of the destination address (modulo N). Then, in the example of FIG. 6, the route presumption table includes entries (i.e. N*N entries) for all combinations of the source address (moduloN) and the destination address (modulo N).

FIG. 7 depicts an example of the test result table stored in the test result table storage 19. In the example of FIG. 7, the test result table includes a column of the source address, a column of the destination address and a column of the route ID. An ID of the communication route through which the test packets passed is set to the column of the route ID. Incidentally, although the details will be explained later, the same number of records as the route presumption table are registered into the test result table. Namely, when N*N entries are included in the route presumption table, N*N records are also registered into the test result table.

Figure 8:
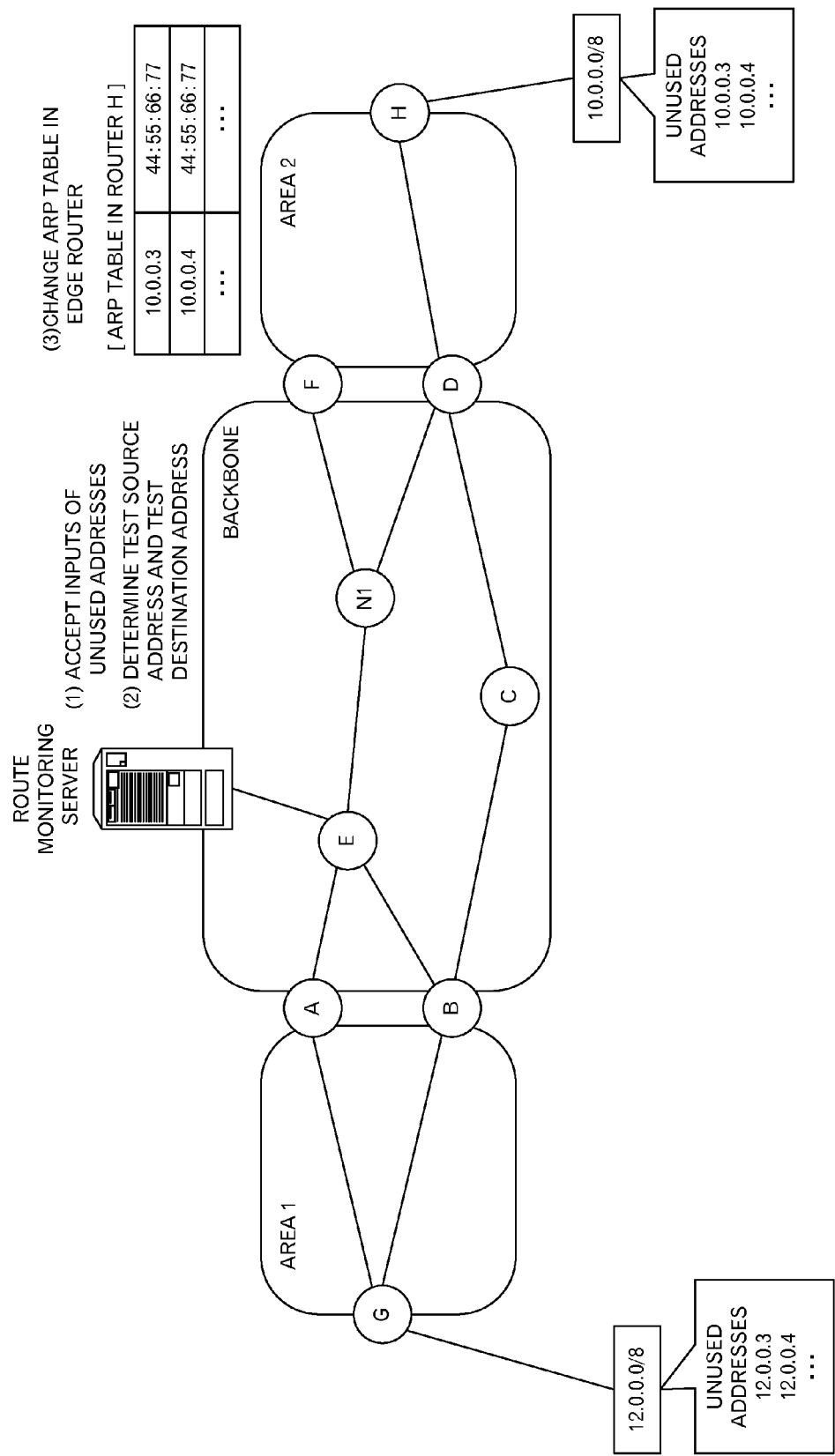
FIG. 8 is a diagram to explain an entire processing flow in the embodiment.

Next, an entire processing flow of this embodiment will be explained by using FIGS. 8 to 19. Here, an example will be explained that, in the network as depicted in FIG. 8, the route monitoring server identifies which of the first route "router G-router A-router E-router N1-router D-router H" and the second route "router G-router B-router C-router D-router H" the packets from the source subnet "12.0.0.0/8" to the destination subnet "10.0.0.0/8" pass through. Incidentally, as presupposition, it is assumed that the routing table as depicted in FIG. 3 has been stored into the routing table storage 12. In addition, it is assumed that the route presumption table as depicted in FIG. 9 has been stored into the route presumption table storage 18. Incidentally, FIG. 9 depicts an example of the route presumption table in a case where the number N of communication routes is "2".

First, for example, an administrator of the route monitoring server operates the route monitoring server to input unused addresses in the source subnet and the destination subnet. Here, it is assumed that the administrator of the route monitoring server has grasped the unused addresses in the source subnet and the destination subnet by carrying out the investigation in advance. Then, the route monitoring server accepts inputs of the unused addresses, and stores them into the unused address storage 20 (FIG. 8: step (1)).

Then, the route monitoring server selects, for each entry stored in the route presumption table, the test source address and the test destination address, which correspond to the pertinent entry, among the unused addresses stored in the unused address storage 20, and registers a record including the selected test source address and test destination address into the test result table (step (2)). Incidentally, at this time, no data is set to the column of the route ID in the test result table.

For example, in the route presumption table depicted in FIG. 9, an address including one final byte whose residue is "0" when dividing one final byte by "2" (=N) is selected as the test source address among "12.0.0.3", "12.0.0.4"..., which are unused addresses in the source subnet "12.0.0.0/8", for the entry whose source address (modulo N) is "0". In addition, an address including one final byte whose residue is "1" when dividing one final byte by "2" (=N) is selected as the test source address among "12.0.0.3", "12.0.0.4"..., which are unused addresses in the source subnet "12.0.0.0/8" for the entry whose source address (modulo N) is "1". Similarly, in the route presumption table depicted in FIG. 9, an address including one final byte whose residue is "0" when dividing one final byte by "2" (=N) is selected as the test destination address among "10.0.0.3", "10.0.0.4"..., which are unused addresses in the destination subnet "10.0.0.0/8", for the entry whose destination address (modulo N) is "0". In addition, an address including one final byte whose residue is "1" when dividing one final byte by "2" (=N) is selected as the test destination address among "10.0.0.3", "10.0.0.4"..., which are unused addresses in the destination subnet "10.0.0.0/8" for the entry whose destination address (modulo N) is "1".

Therefore, the route monitoring server selects, as the test source address and test destination address, which correspond to the entry in the first line of the route presumption table (FIG. 9), "12.0.0.4" and "10.0.0.4", for example. In addition, the route monitoring server selects, as the test source address and test destination address, which correspond to the entry in the second line of the route presumption table (FIG. 9), "12.0.0.4" and "10.0.0.3", for example. Furthermore, the route monitoring server selects, as the test source address and test destination address, which correspond to the entry in the third line of the route presumption table (FIG. 9), "12.0.0.3" and "10.0.0.4", for example. Moreover, the route monitoring server selects, as the test source address and test destination address, which correspond to the entry in the fourth line of the route presumption table (FIG. 9), "12.0.0.3" and "10.0.0.4", for example.

Then, the route monitoring server issues the SNMP command to the router H, which is identified as an edge router on the boundary with the destination subnet, to cause the router H to change the settings of the ARP table in the router H (step (3)). Specifically, the route monitoring server issues the SNMP command for causing to change the settings of MAC addresses respectively corresponding to the test destination addresses ("10.0.0.3" and "10.0.0.4" in the aforementioned explanation), which were determined at the step (2), to the MAC address ("44:55:66:77" in FIG. 8) of the router H. Incidentally, this is because it is necessary to prevent from the router H transferring the packets addressed to the test destination address to the destination subnet "10.0.0.0/8".

Figure 10:
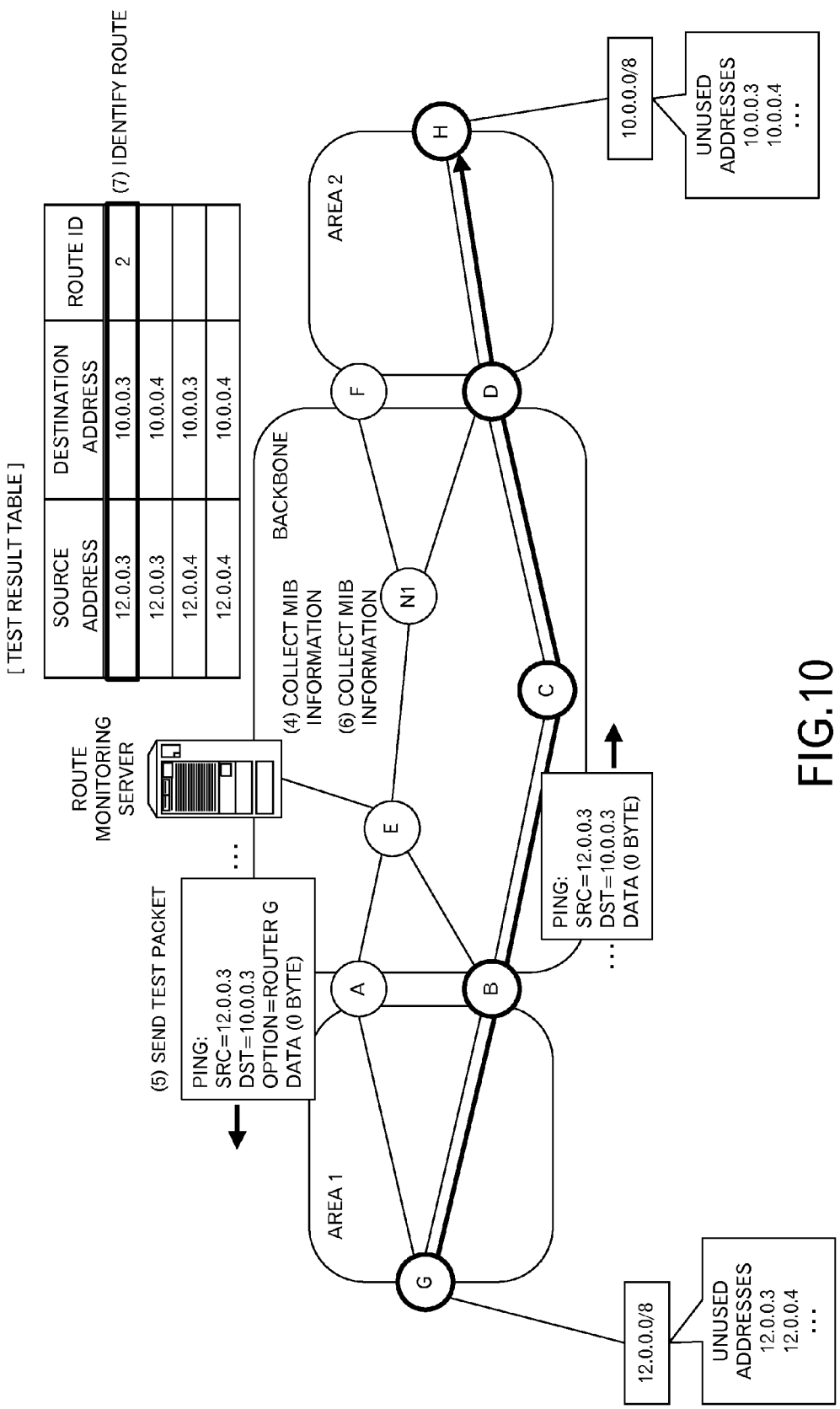
FIG. 10 is a diagram to explain a processing to transmit a test packet (SRC=12.0.0.3, DST=10.0.0.3) and identify the communication route of the test packet.

Shifting to the explanation of FIG. 10, the route monitoring server identifies one unprocessed record in the test result table. Here, it is assumed that the record including, as the source address and destination address, "12.0.0.3" and "10.0.0.3" were identified.

Then, the route monitoring server collects the RMON MIB information from the respective routers to be measured (routers A and B in FIG. 10) (FIG. 10: step (4)). For example, the routers A and B are identified as first routers after the branch of the first and second communication routes. Next, the route monitoring server stores, as the number of input packets before the test packet transmission, the value of the input packet counter, which is included in the collected RMON MIB information, into the count table for each router to be measured. Incidentally, the input packet counter is held for each interface, and includes plural counters according to packet sizes, as depicted in FIG. 11. In this embodiment, because the packet whose packet size is less than 64 bytes is used as the test packet, the total value of values of "etherStatsUndersizePkts" and "etherStatsPkts64Octets" is stored into the count table.

Then, the route monitoring server generates the ping packet by using the source address and destination address, which are included in the identified record, and transmits, as the test packet, the generated packet, the predetermined number of times (step (5)). At this time, the route monitoring server sets, as the source routing, the address of the router G into the option field of the IP header so that the test packet passes through the router G. Incidentally, because the ARP table of the router H was changed at the step (3), this test packet (SCR=12.0.0.3, DST=10.0.0.3) is not transferred to the destination subnet "10.0.0.0/8".

Then, the route monitoring server collects the RMON MIB information from the respective routers to be measured again after transmitting the test packet the predetermined number of times (step (6)). In addition, the route monitoring server stores, as the number of input packets after the test packet transmission, the value of the input packet counter, which is included in the collected RMON MIB information, into the count table, for each router to be measured.

Then, the route monitoring server calculates a difference between the number of input packets before the test packet transmission and the number of input packets after the test packet transmission, and identifies the communication route through which the test packet passed, based on the differences (step (7)). The route ID of the identified communication route is registered into the test result table.

For example, when data as depicted in FIG. 12 is stored into the count table, it is understood that the test packet (SRC=12.0.0.3, DST=10.0.0.3) passed through the router B (i.e. the second route). Therefore, the second route is identified as the communication route of the test packet and the route ID "2" is registered into the test result table.

Figure 13:
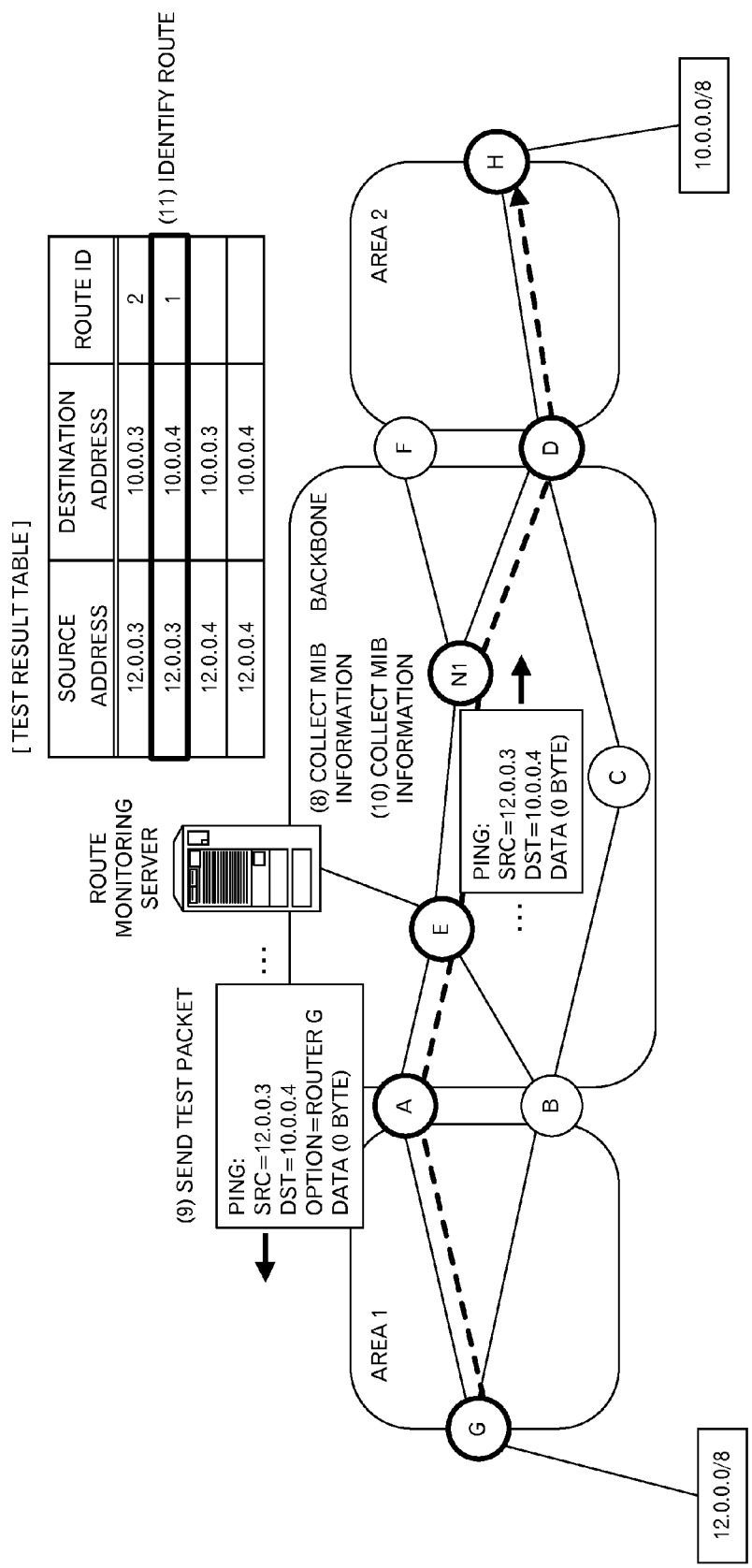
FIG. 13 is a diagram to explain a processing to transmit a test packet (SRC=12.0.0.3, DST=10.0.0.4) and identify the communication route of the test packet.

Shifting to the explanation of FIG. 13, the route monitoring server identifies the next record in the test result table. Here, it is assumed that the record including, as the source address and destination address, "12.0.0.3" and "10.0.0.4" was identified. Then, the route monitoring server clears the count table and collects the RMON MIB information from the respective routers to be measured (FIG. 13: step (8)). In addition, the route monitoring server stores, as the number of input packets before the test packet transmission, the value of the input packet counter, which is included in the collected RMON MIB information, into the count table, for each router to be measured.

Then, the route monitoring server generates the ping packet by using the source address and destination address, which are included in the identified record, and transmits, as the test packet, the generated ping packet the predetermined number of times (step (9)). At this time, the route monitoring server sets, as the source routing, the address of the router G into the option field so that the test packet passes through the router G. Incidentally, because the ARP table in the router H was changed at the step (3), this test packet (SRC=12.0.0.3, DST=10.0.0.4) is not transferred to the destination subnet "10.0.0.0/8".

Then, the route monitoring server collects the RMON MIB information from the respective routers to be measured, again, after transmitting the test packet the predetermined number of times (step (10)). In addition, the route monitoring server stores, as the number of input packets after the test packet transmission, the value of the input packet counter, which is included in the collected RMON MIB information, into the count table, for each router to be measured.

Then, the route monitoring server calculates the difference between the number of input packets before the test packet transmission and the number of input packets after the test packet transmission, and identifies the communication route through which the test packets passed, based on the calculated differences (step (11)). The route ID of the identified communication route is registered into the test result table.

For example, when data as depicted in FIG. 14 is stored in the count table, it is understood that the test packet (SRC=12.0.0.3, DST=10.0.0.4) passed through the router A (i.e. the first route). Therefore, the first route is identified as the communication route of this test packet, and the route ID "1" is registered into the test result table.

Figure 15:
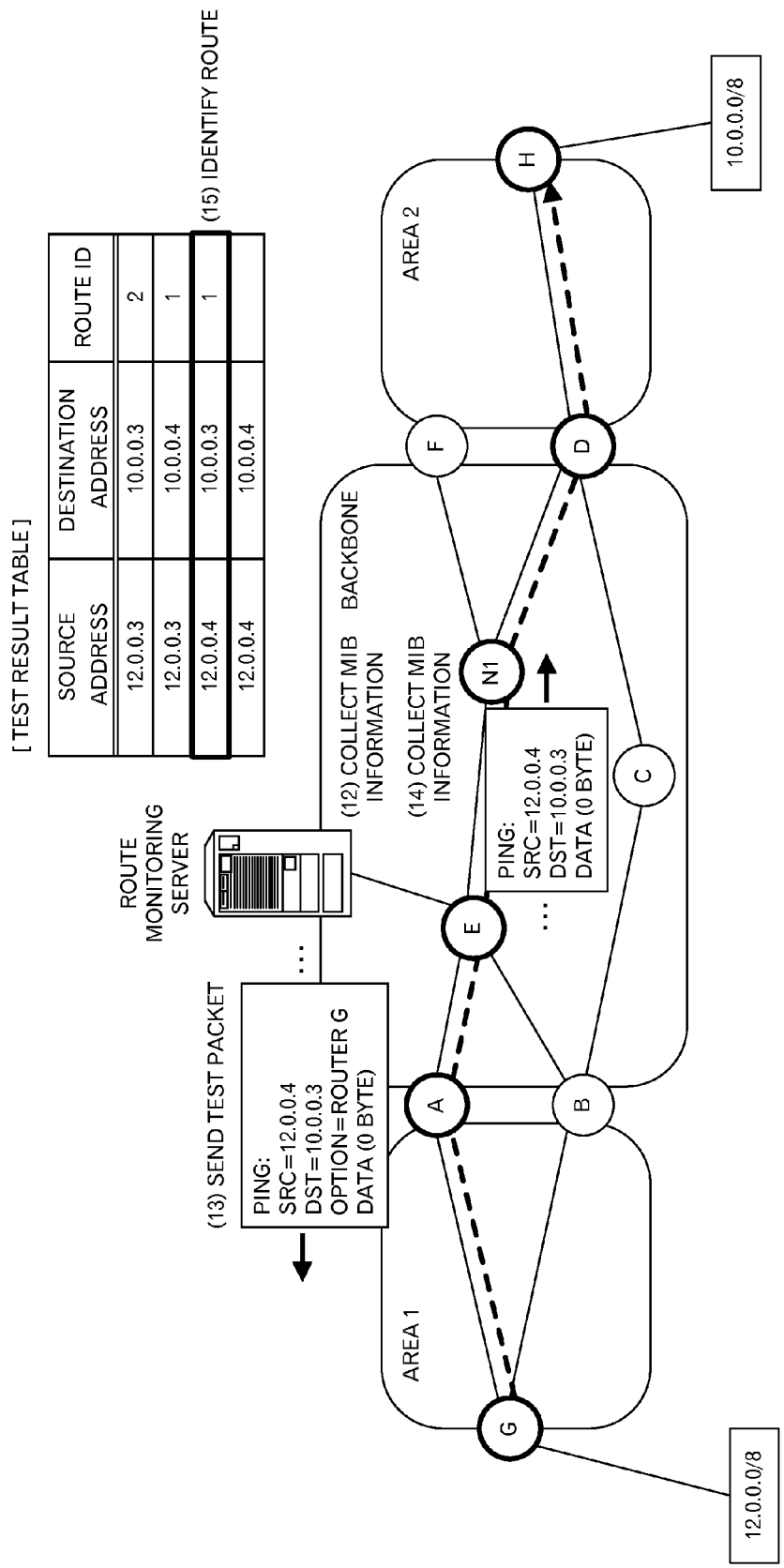
FIG. 15 is a diagram to explain a processing to transmit a test packet (SRC=12.0.0.4, DST=10.0.0.3) and identify the communication route of the test packet.

Shifting to the explanation of FIG. 15, the route monitoring server identifies the next record in the test result table. Here, it is assumed that the record including, as the source address and destination address, "12.0.0.4" and "10.0.0.3" was identified.

Then, the route monitoring server collects the RMON MIB information from the respective routers to be measured, after clearing the count table (FIG. 15: step (12)). In addition, the value of the input packet counter, which is included in the collected RMON MIB information, is stored, as the number of input packets before the test packet transmission, into the count table, for each router to be measured.

Then, the route monitoring server generates the ping packet by using the source address and destination address, which are included in the identified record, and transmits, as the test packet, the ping packet the predetermined number of times (step (13)). At this time, the address of the router G is set, as the source routing, into the option field of the IP header, so that the test packet passes through the router G. Incidentally, because the ARP table of the router H was changed at the step (3), this test packet (SRC=12.0.0.4, DST=10.0.0.3) is not transferred to the destination subnet "10.0.0.0/8".

Then, the route monitoring server collects the RMON MIB information from the respective routers to be measured, again, after transmitting the test packet the predetermined number of times (step (14)). In addition, the value of the input packet counter, which is included in the collected RMON MIB information is stored, as the number of input packets after the test packet transmission, into the count table, for each router to be measured.

Then, the route monitoring server calculates the difference between the number of input packets before the test packet transmission and the number of input packets after the test packet transmission, and identifies the communication route through which the test packet passed, based on the differences (step (15)). The route ID of the identified communication route is registered into the test result table.

Figures 16, 18, 22:
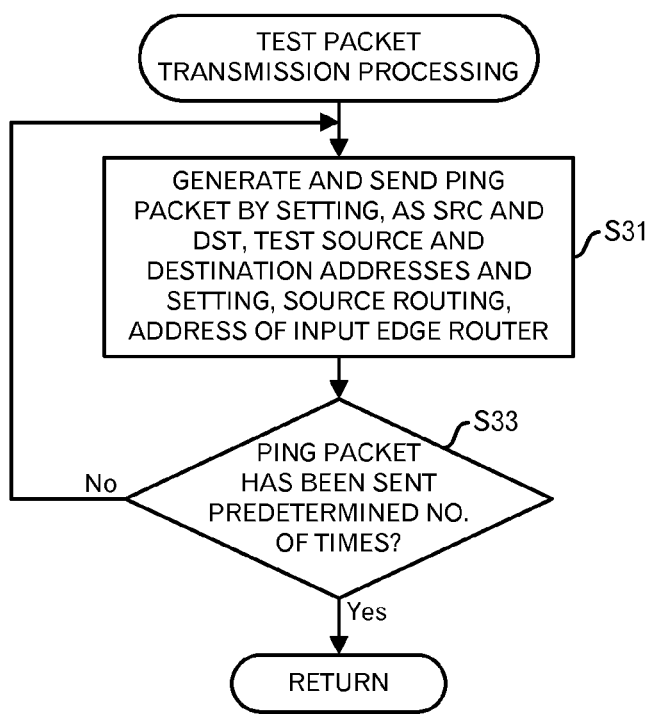
FIG. 16 is a diagram depicting the number of input packets before and after the test packet transmission (SRC=12.0.0.4, DST=10.0.0.3)
FIG. 18 is a diagram depicting the number of input packets before and after the test packet transmission (SRC=12.0.0.4, DST=10.0.0.4)
FIG. 22 is a diagram depicting a processing flow of a test packet transmission processing.

For example, when data as depicted in FIG. 16 is stored in the count table, it is understood that the test packet (SRC=12.0.0.4, DST=10.0.0.3) passed through the router A (i.e. the first route). Therefore, the first route is identified as the communication route of this test packet, and the route ID "1" is registered into the test result table.

Figure 17:
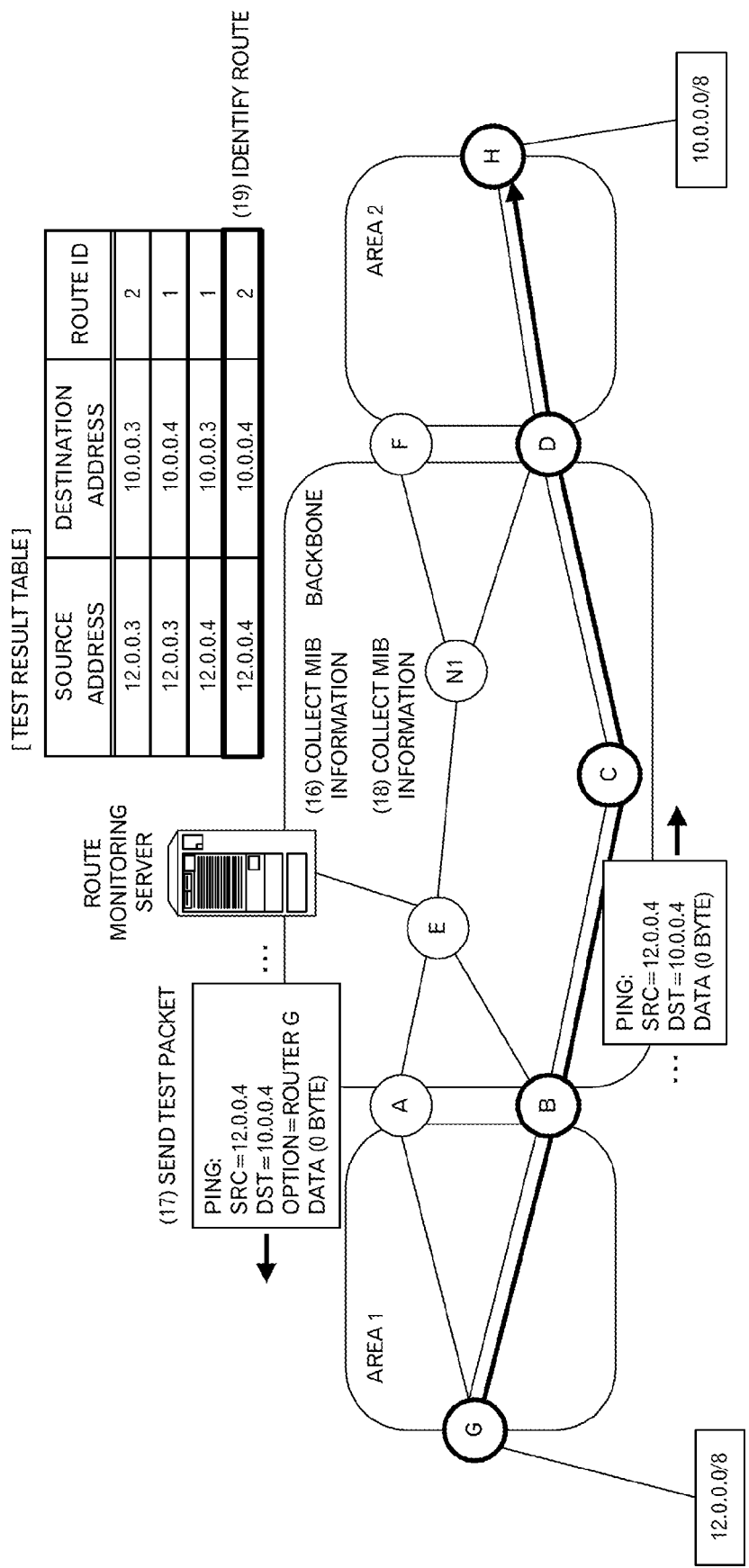
FIG. 17 is a diagram to explain a processing to transmit a test packet (SRC=12.0.0.4, DST=10.0.0.4) and identify the communication route of the test packet.

Shifting to the explanation of FIG. 17, the route monitoring server identifies the next record in the test result table. Here, it is assumed that the record including "12.0.0.4" and "10.0.0.4" as the source address and destination address was identified.

Then, the route monitoring server collects the RMON MIB information from the respective routers to be measured, after clearing the count table (FIG. 17: step (16)). In addition, the value of the input packet counter, which is included in the RMON MIB information is stored, as the number of input packets before the test packet transmission, into the count table for each router to be measured.

Then, the route monitoring server generates the ping packet by using the source address and destination address, which are included in the identified record, and transmits, as the test packet, the ping packet the predetermined number of times (step (17)). At this time, the address of the router G is set, as the source routing, into the option field of the IP address, so that the test packet passes through the router G. Incidentally, because the ARP table of the router H was changed at the step (3), this test packet (SRC=12.0.0.4, DST=10.0.0.4) is not transferred to the destination subnet "10.0.0.0/8".

Then, the route monitoring server collects the RMON MIB information from the respective routers to be measured, again, after transmitting the test packet the predetermined number of times (step (18)). In addition, the value of the input packet counter, which is included in the collected RMON MIB information, is stored, as the number of input packets after the test packet transmission, into the count table, for each router to be measured.

Then, the route monitoring server calculates the difference between the number of input packets before the test packet transmission and the number of input packets after the test packet transmission, and identifies the communication route through which the test packet passed, based on the differences (step (19)). The route ID of the identified communication route is registered into the test result table.

For example, when data as depicted in FIG. 18 is stored in the count table, it is understood that the test packet (SRC=12.0.0.4, DST=10.0.0.4) was passed through the router B (i.e. the second route). Therefore, the second route is identified as the communication route of this test packet, and the route ID "2" is registered into the test result table.

Then, when the route monitoring server completes the processing for all records in the test result table, the route monitoring server registers the route ID into the route presumption table according to the test result table.

In FIG. 19, a record 1901 (including "12.0.0.3" and "10.0.0.3") in the test result table corresponds to an entry 1914 in which both of the source address modulo N and the destination address modulo N are "1". Therefore, "2" is registered to the column of the route ID of the entry 1914 according to the record 1901. In addition, a record 1902 (including "12.0.0.3" and "10.0.0.4") in the test result table corresponds to an entry 1913 in which the source address modulo N is "1" and the destination address modulo N is "0". Therefore, "1" is registered to the column of the route ID in the entry 1913 according to the record 1902. Furthermore, a record 1903 (including "12.0.0.4" and "10.0.0.3") in the test result table corresponds to an entry 1912 in which the source address modulo N is "0" and the destination address modulo N is "1". Therefore, "1" is registered to the column of the route ID in the entry 1912 according to the record 1903. In addition, a record 1904 (including "12.0.0.4" and "10.0.0.4") in the test result table corresponds to an entry 1911 in which both of the source address modulo N and the destination address modulo N are "0". Therefore, "2" is registered to the column of the route ID in the entry 1911 according to the record 1904.

Incidentally, because the route presumption table is configured according to the allocation rule of the communication route, it is possible to presume the communication route of the packet, which will be actually transmitted, from this route presumption table. For example, as for the packet transmitted from "12.0.0.1" to "10.0.0.1" is pertinent to the entry 1914 depicted in FIG. 19, because both of the source address modulo N and the destination address modulo N are "1". Therefore, the communication route of the packet transmitted from "12.0.0.1" to "10.0.0.1" may be presumed as the second route, from the route presumption table.

Figure 20:
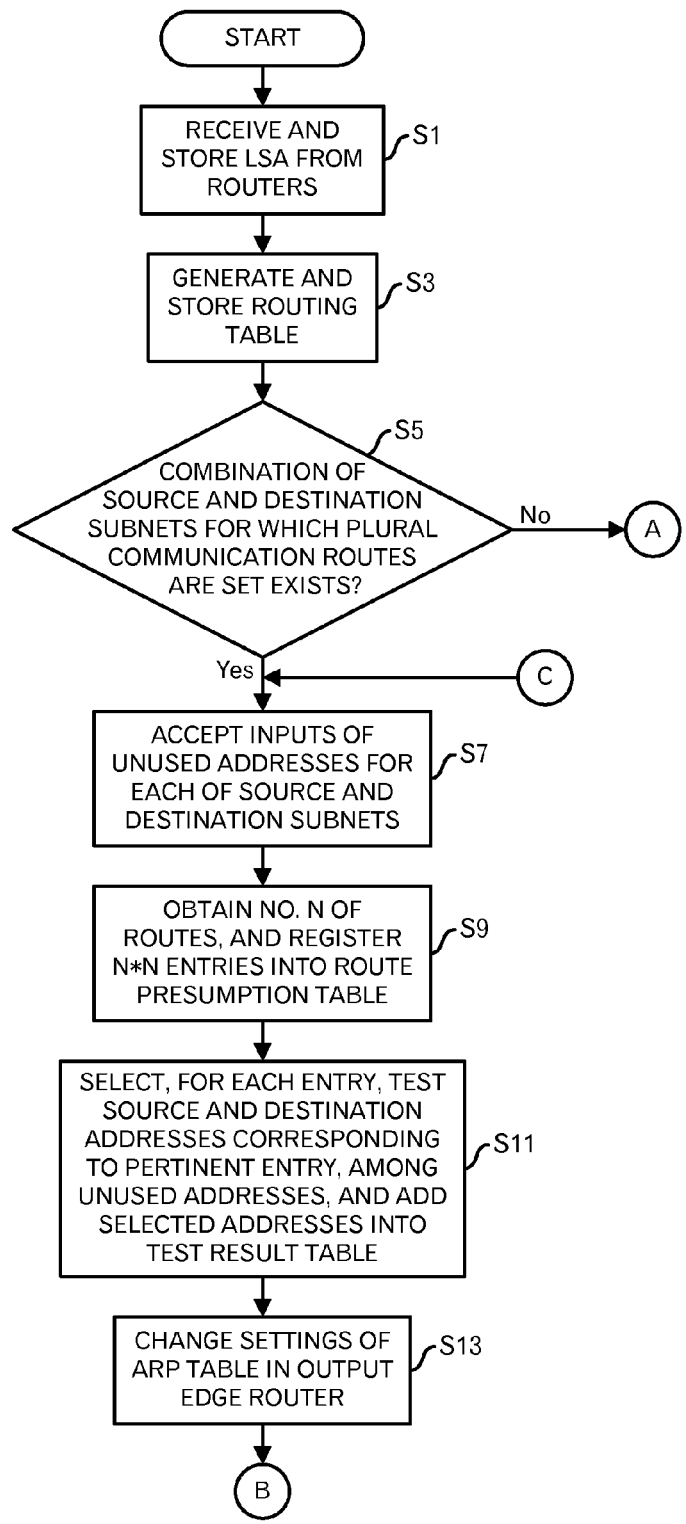
FIG. 20 is a diagram depicting a first portion of a processing flow executed by a route monitoring server.

Next, a specific processing flow of the processing carried out by the route monitoring server will be explained by using FIGS. 20 to 23. First, the topology and route manager 11 receives LSA from the respective routers, and stores the received data into a storage device such as the main memory (FIG. 20: step S1). Then, the topology and route manager 11 generates a routing table from LSA stored in the storage device, and stores the routing table into the routing table storage 12 (step S3). For example, the routing table as depicted in FIG. 3 is generated.

Then, the topology and route manager 11 judges whether or not any combination of the source subnet and the destination subnet, for which plural communication routes are set, is stored in the routing table (step S5). When any combination for which the plural communication routes are set is not stored in the routing table (step S5: No route), the processing ends through a terminal A.

On the other hand, when the combination for which the plural communication routes are set is stored in the routing table (step S5: Yes route), the topology and route manager 11 instructs the route judging unit 13 to identify the communication route.

Then, when the route judging unit 13 receives an instruction to identify the communication route from the topology and route manager 11, the route judging unit 13 displays a screen for inputting unused addresses (not depicted) onto a display device. In response to the screen display, for example, an administrator of the route monitoring server operates the route monitoring server to input the unused addresses for each of the source subnet and the destination subnet. Here, it is assumed that the administrator of the route monitoring server has grasped the unused addresses in the source subnet and the destination subnet by carrying out the investigation in advance. Then, the route judging unit 13 accepts inputs of the unused addresses for each of the source subnet and the destination subnet, and stores the input data into the unused address storage 20 (step S7). Incidentally, the processing of this step corresponds to the step (1) depicted in FIG. 8.

Then, the route judging unit 13 obtains the number N of communication routes from the routing table, and registers N*N entries into the route presumption table (step S9). Namely, the route judging unit 13 registers the entries of all combinations of the source address modulo N and the destination address modulo N into the route presumption table.

Then, the test address determination unit 131 of the route judging unit 13 selects, for each entry of the route presumption table, the test source address and the test destination address, which correspond to the pertinent entry, among the unused addresses, and adds a record including the selected test source address and test destination address to the test result table (step S11). Incidentally, the processing of this step corresponds to the step (2) depicted in FIG. 8.

Then, the route judging unit 13 outputs an instruction for causing to issue an SNMP command to the table controller 14. The instruction includes the test destination address selected at the step S11. Here, the output edge route is a router, which is connected to the destination subnet at the end of the communication route. Then, when the table controller 14 receives the instruction for causing to issue the SNMP command, the table controller 14 causes the output edge router to change the ARP table of the output edge router by issuing the SNMP command for causing to change the settings of the ARP table to the output edge router (step S13). Here, the ARP table is changed so that MAC address corresponding to the test destination address included in the instruction for causing to issue the SNMP command is changed to the MAC address of the output edge router. Incidentally, the processing of this step corresponds to the step (3) depicted in FIG. 8. After that, the processing shifts to the step S15 in FIG. 21 through a terminal B.

Figure 21:
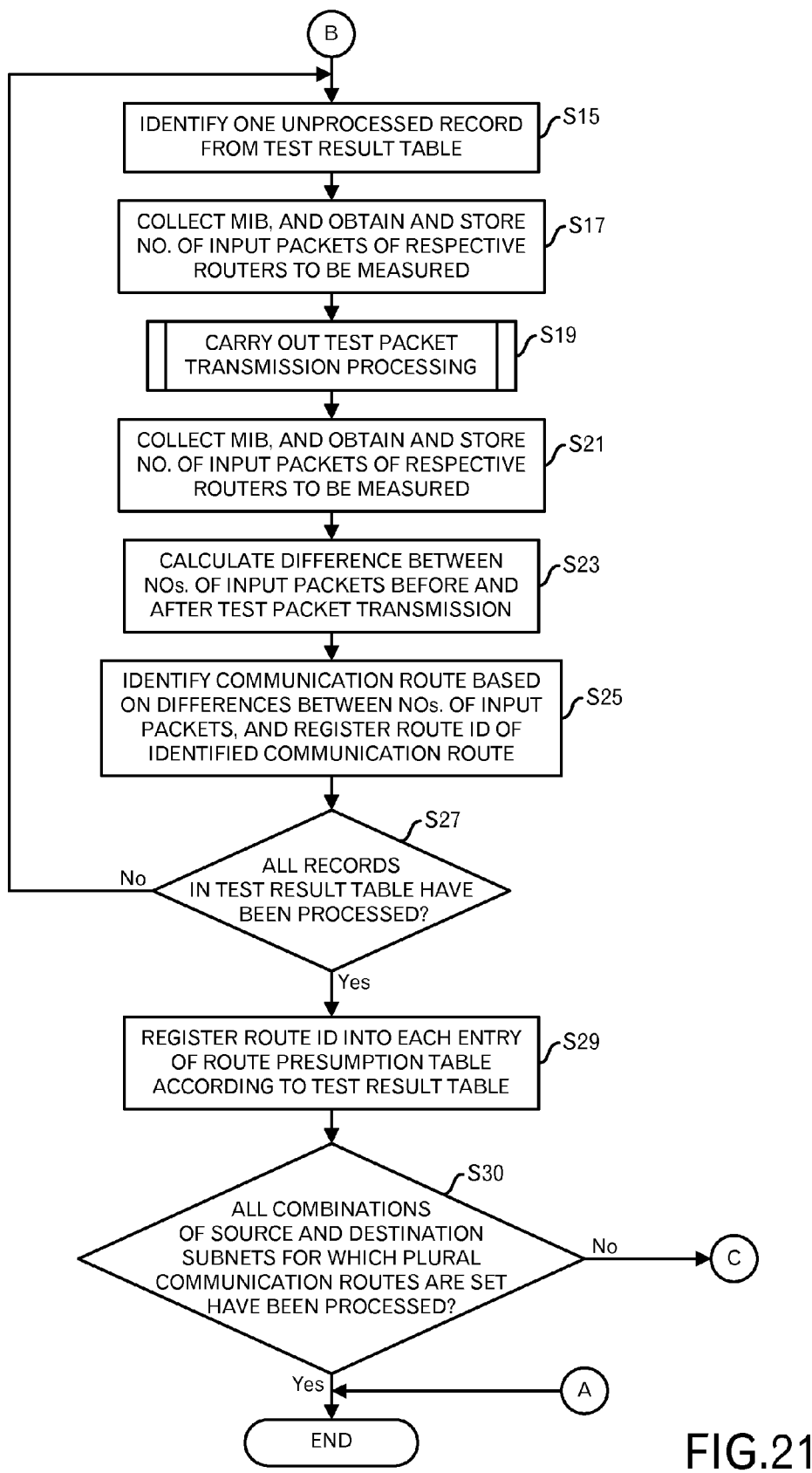
FIG. 21 is a diagram depicting a second portion of the processing flow executed by the route monitoring server.

Shifting to the explanation of FIG. 21, after the terminal B, the route judging unit 13 identifies one unprocessed record from the test result table (FIG. 21: step S15). Then, the route judging unit 13 instructs the measured value obtaining unit 16 to obtain the RMON MIB information.

In response to the instruction from the route judging unit 13, the measured value obtaining unit 16 collects the RMON MIB information from the respective routers to be measured, by transmitting to the SNMP command to the respective routers to be measured. The routers to be measured are identified based on a branch on the communication routes to be investigated, for example. After that, the measured value obtaining unit 16 stores the value of the input packet counter, which is included in the collected RMON MIB information, into the column of the number of input packets before the test packet transmission in the count table, for each router to be measured (step S17). Incidentally, as described above, the total value of "etherStatsUndersizePkts" and "etherStatsPkts64Octets" is stored into the count table. The processing of this step corresponds to the step (4) depicted in FIG. 10, the step (8) depicted in FIG. 13, the step (12) depicted in FIG. 15 and the step (16) depicted in FIG. 17.

After that, the route judging unit 13 outputs an instruction for causing to transmit the test packet to the test packet transmitter 15. The instruction includes the test source address and the test destination address, which are included in the identified record. When the test packet transmitter 15 receives the instruction for causing to transmit the test packet from the route judging unit 13, the test packet transmitter 15 carries out a test packet transmission processing by using the test source address and the test destination address, which are included in the instruction for causing to transmit the test packet (step S19). This test packet transmission processing will be explained by using FIGS. 22 and 23. Incidentally, the processing of this step corresponds to the step (5) depicted in FIG. 10, the step (9) depicted in FIG. 13, the step (13) depicted in FIG. 15 and the step (17) depicted in FIG. 17.

Figure 23:
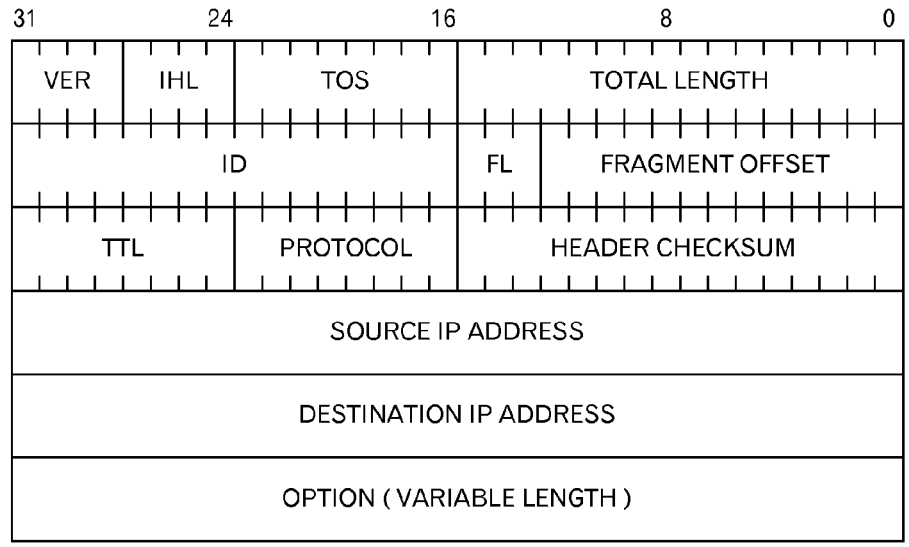
FIG. 23 is a diagram depicting an IP header configuration.

First, the test packet transmitter 15 generates the ping packet by setting the test source address and the test destination address to SRC and DST and setting, as the source routing, the address of the input edge router to the option field of the IP header, and transmits, as the test packet, the generated ping packet (FIG. 22: step S31). Here, the input edge router is a router, which is connected with the source subnet at the head of the communication route. In addition, the configuration of the IP header is depicted in FIG. 23. Incidentally, because the IP header is the same as the conventional one, further explanation is omitted.

Then, the test packet transmitter 15 judges whether or not the number of transmission times of the test packet reaches the predetermined number of times (step S33). When the number of transmission times of the test packet does not reach the predetermined number of times (step S33: No route), the processing returns to the step S31, and the aforementioned processing is repeated until the number of transmission times reaches the predetermined number of times.

On the other hand, when the number of transmission times of the test packet reaches the predetermined number of times (step S33: Yes route), the test packet transmission processing is completed, and the processing returns to the calling source processing.

Returning to the explanation of FIG. 21, after the test packet transmission processing is carried out, the route judging unit 13 instructs the measured value obtaining unit 15 to obtain the RMON MIB information.

Then, in response to the instruction from the route judging unit 13, the measured value obtaining unit 16 transmits the SNMP command to the respective routers to be measured, and collects the RMON MIB information from the respective routers to be measured. After that, the measured value obtaining unit 16 stores the value of the input packet counter, which is included in the collected RMON MIB information, into the column of the number of input packets after the test packet transmission, in the count table, for each router to be measured (step S21). Incidentally, as described above, the total value of "etherStatsUndersizePkts" and "etherStatsPkts64Octets" is stored into the count table. The processing of this step corresponds to the step (6) depicted in FIG. 10, the step (10) depicted in FIG. 13, the step (14) depicted in FIG. 15 and the step (18) depicted in FIG. 17.

Then, the communication route identifying unit 132 of the route judging unit 13 calculates the difference between the number of input packets before the test packet transmission and the number of input packets after the test packet transmission, which are stored in the count table, for each of the routers to be measured, and stores the calculated difference into the storage device such as the main memory (step S23).

Then, the communication route identifying unit 132 identifies the communication route based on the differences between the number of input packets before the test packet transmission and the number of input packets after the test packet transmission, and registers the route ID of the identified communication route into the test result table (step S25). Namely, the communication route identifying unit 132 identifies the communication route including the router to be measured, whose difference between the number of input packets before the test packet transmission and the number of input packets after the test packets is equal to or close to the number of transmission times of the test packet. Incidentally, the processing of this step corresponds to the step (7) depicted in FIG. 10, the step (11) depicted in FIG. 13, the step (15) depicted in FIG. 15 and the step (19) depicted in FIG. 17.

Then, the route judging unit 13 judges whether or not the processing for all records in the test result table has been completed (step S27). When the processing for all records in the test result table has not been completed (step S27: No route), the processing returns to the step S15, and the aforementioned processing will be repeated.

On the other hand, when the processing for all records in the test result table has been completed (step S27: Yes route), the route judging unit 13 registers the route ID into the respective entries in the route presumption table according to the test result table (step S29). When the processing of this step is carried out, the route ID is registered into each of the entries in the route presumption table. After that, the route judging unit 13 judges whether or not all of the combinations of the source subnet and the destination subnet, for which the plural communication routes are set, have been processed (step S30). When the processing for all of the combinations of the source subnet and the destination subnet, for which the plural communication routes are set, has not been completed (step S30: No route), the processing returns to the step S7 through the terminal C, and the aforementioned processing is carried out for unprocessed combination. On the other hand, when the processing for all of the combinations for which the plural communication routes are set has been processed (step S30: Yes route), the processing is terminated.

By carrying out the aforementioned processing, it is possible to identify the communication route of the test packet without imposing the load to the destination subnet. In addition, it is possible to presume the communication route of the individual packet actually transmitted from the source subnet to the destination subnet.

Although one embodiment of this technique was explained, this technique is not limited to this embodiment. For example, the functional blocks of the route monitoring server and the router do not always correspond to the actual program module configuration.

In addition, the respective table configuration is a mere example, and the aforementioned configuration may not be always adopted. Furthermore, the step order in the processing may be exchanged as long as the processing result does not change. Furthermore, the steps may be executed in parallel.

Figure 25:
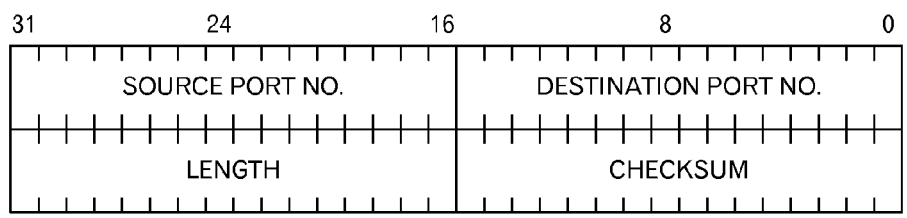
FIG. 25 is a diagram depicting a UDP header configuration.
Figure 24:
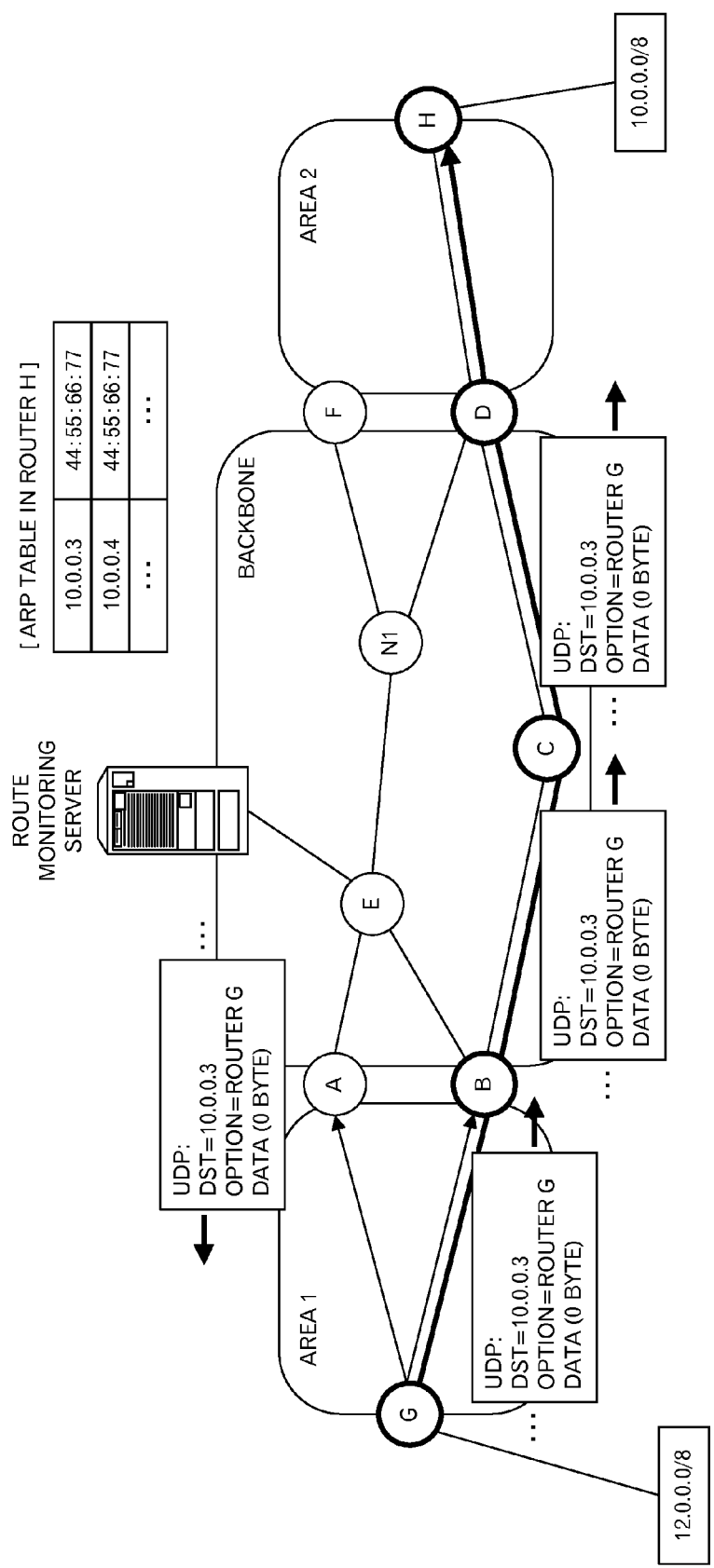
FIG. 24 is a diagram depicting a variation when a UDP packet is used.

Incidentally, although an example that the ping packet is transmitted as the test packet was explained above, a User Datagram Protocol (UDP) packet as depicted in FIG. 24 may be transmitted. In such a case, the UDP packet may be generated by adding the UDP header as depicted in FIG. 25.

Figure 26:
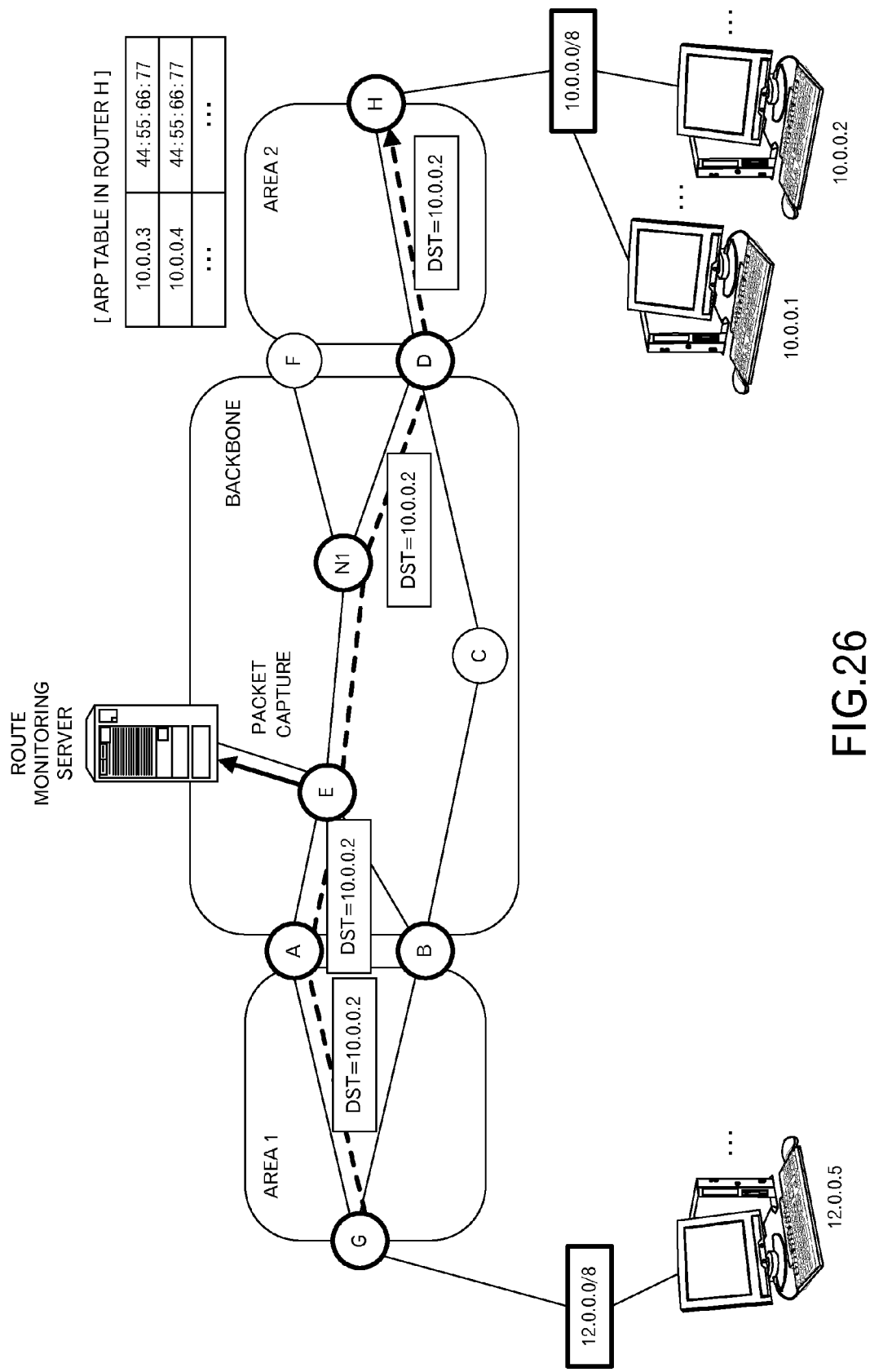
FIG. 26 is a diagram depicting a variation when the packet is captured.
Figure 27:
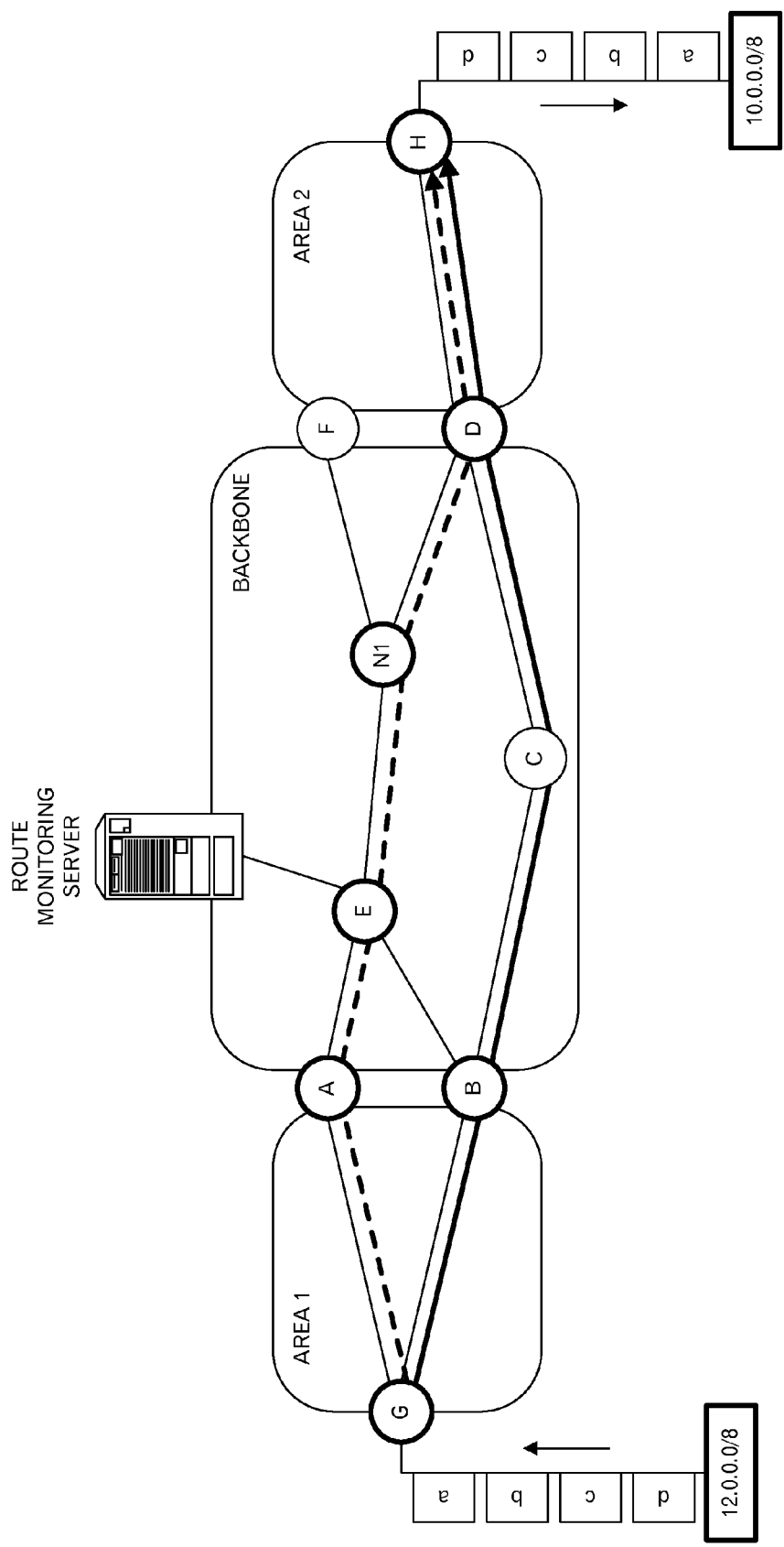
FIG. 27 is a diagram depicting a network configuration example.
Figure 28:
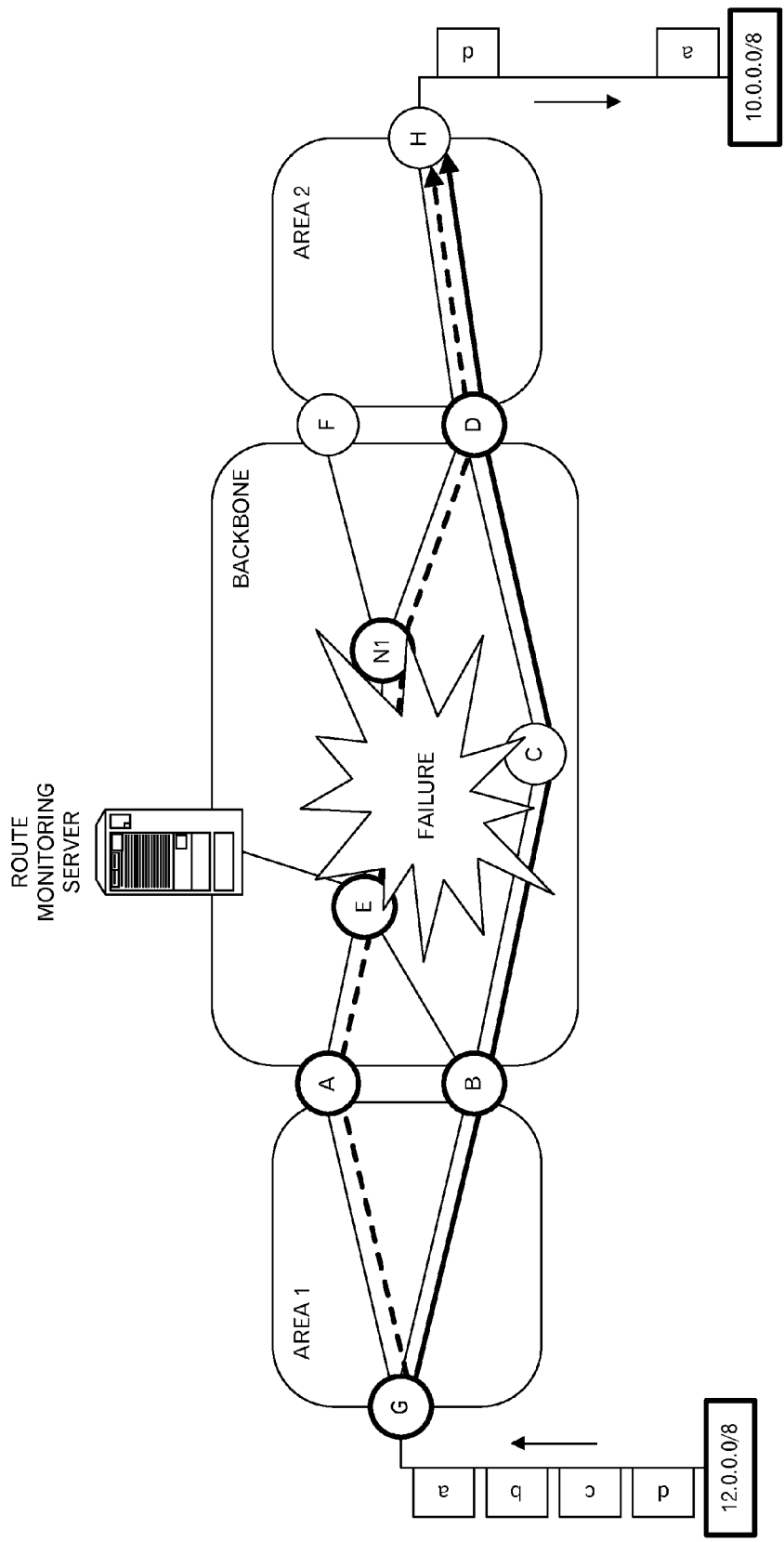
FIG. 28 is a diagram depicting an example of a network failure.

In addition, although an example that the test packet is transmitted for each record in the test result table to identify the communication route based on the differences between the number of input packets before the test packet transmission and the number of input packets after the test packet transmission was explained above, the route monitoring server may captures packets (SRC=12.0.0.5, DST=10.0.0.2 in FIG. 26), which are actually transmitted, and may register the route ID of the communication route through which this packet passed, into the route presumption table. For example, in FIG. 26, because it is understood, by capturing the packets, that the packet passed through the first route, the route ID "1" is registered into an entry whose source address modulo N is "1" and destination address modulo N is "0" are set. Incidentally, as for the remaining entries, the route ID may be registered by the aforementioned processing.

In addition, although an example of the route presumption table including all combinations of the source address modulo N and the destination address modulo N was explained, the route presumption table may be configured according to a new rule when the allocation rule of the communication route is changed. For example, when the packet allocation is biased to one route because of the special circumstances, the route presumption table is configured according to the biased allocation.

In addition, although an example that two counters "etherStatsUndersizePkts" and "etherStatsPkts64Octets" were used was explained above, other counters for other sizes may be used when the test packet having a size, which is hardly used in the network, may be transmitted, and the communication route may be identified by comparing the counter values before and after the test packet transmission.

The aforementioned embodiments are outlined as follows:

A method for presuming a communication route in a first network connecting to second and third networks includes: identifying a test source address among preset and unused addresses in the second network and a test destination address among preset and unused addresses in the third network, wherein a packet is presumed to be transmitted from the second network to the third network through a plurality of communication routes in the first network; causing an output edge router that is an edge router connected to the third network and provided at a boundary of the first network to change settings of an Address Resolution Protocol table of the output edge router so as not to transfer a packet addressed to the test destination address to the third network; obtaining, as a first number of input packets, a value of an input packet counter from each of routers to be monitored on each of the plurality of communication routes; generating a test packet including, as a source routing, an address of an input edge router that is an edge router connected to the second network, in the first network, and including, as source and destination addresses, the test source address and the test destination address, and transmitting the generated test packet a predetermined number of times; obtaining, as a second number of input packets, a value of the input packet counter from each of the routers to be monitored; calculating a difference between the first number of input packets and the second number of input packets for each of the plurality of communication routes; and identifying a communication route through which the test packets passed, based on the calculated differences.

By carrying out such a processing, it becomes possible for a computer (e.g. route monitoring server) for monitoring the first network to identify the communication route through which the test packet passes, among the plurality of communication routes. In addition, because the test packet is transmitted after the setting of the ARP table in the output edge router was changed not so as to transfer the packet addressed to the test destination address to the third network, the communication route can be identified without imposing the load to the third network.

In addition, the identifying the test source address and the test destination address may include: based on a route presumption table storing, for each combination of source addresses and destination addresses, identification information of the communication route through which the packet transmitted from the address belonging to the source addresses to the address belonging to the destination addresses is presumed to pass identifying, the test source address that is any one of unused addresses, which are included in the second network and belong to the source addresses relating to a specific combination, and the test destination address that is any one of unused addresses, which are included in the third network and belong to the destination addresses relating to the specific combination. Then, the aforementioned method may further include: storing the identification information of the communication route identified at the aforementioned identifying the communication route in association with the specific combination into the route presumption table.

For example, when the user knows the allocation rule of the communication route in advance, it is possible to automatically register the identification information of the communication route corresponding to each of the combinations of the source addresses and the destination addresses, in a case where the combinations are prepared in advance according to the allocation rule. As a result, it becomes possible to presume the communication route of the packet actually transmitted from the second network to the third network from the route presumption table.

Furthermore, the communication route presumption method may further include generating the route presumption table including all combinations of first groups of the source addresses and second groups of the destination addresses, wherein the first groups of the source addresses and the second group of the destination addresses are formed based on a result of a modulo arithmetic using the number of communication routes through which the packet transmitted from the second network to the third network is presumed to pass.

Thus, when the communication route is allocated according to the result of the modular calculation for the source address and the destination address, it is unnecessary for the user to prepare the combination of the source addresses and destination addresses.

In addition, the aforementioned transmitting the generated test packet may include causing to transmit the test packet whose size is equal to or less than 64 bytes. Then, the aforementioned first and second obtaining may include obtaining, as the value of the input packet counter, a value of the counter for packets whose size is equal to or less than 64 bytes. The typical packets flowing in the network has a packet size greater than 64 bytes, and by adopting such a processing, it becomes possible to distinguish the test packet from the other normal packets and to identify more accurate communication route.

Incidentally, it is possible to create a program for causing a computer to execute the aforementioned communication route presumption method, and this program is stored into such a computer-readable storage medium or a storage apparatus such as a flexible disk, a CD-ROM, a magneto-optical disk, a semiconductor memory, or a hard disk. In addition, an intermediate processing result is temporarily stored in a storage device such as a main memory.

Figure 29:
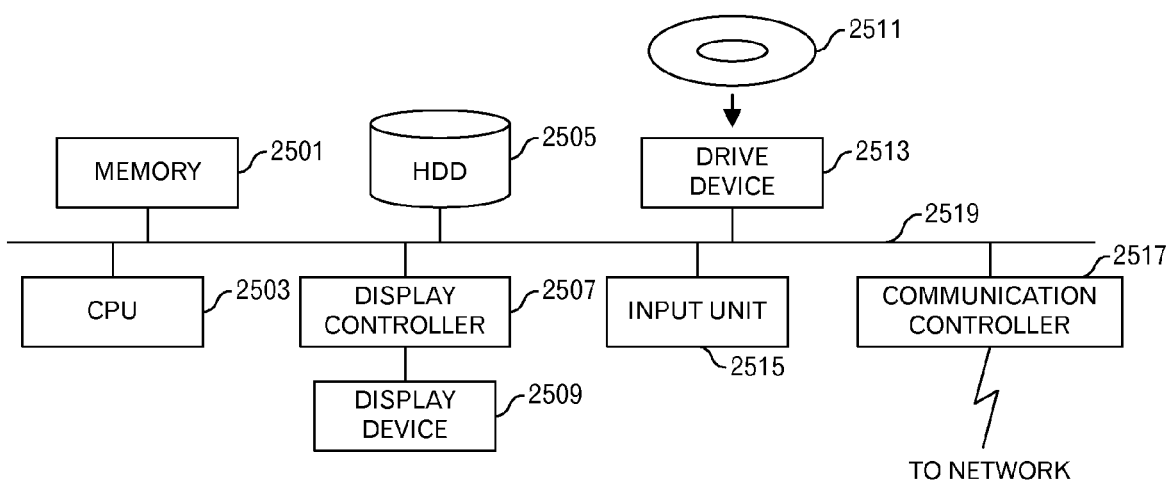
FIG. 29 is a functional block diagram of a computer.

In addition, the route monitoring server is a computer device as shown in FIG. 29. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as shown in FIG. 29. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program for causing a computer to execute a process for presuming a communication route in a first network connecting with second and third networks, said process comprising:

first identifying a test source address among unused addresses in said second network and a test destination address among unused addresses in said third network, wherein a packet is presumed to be transmitted from said second network to said third network through a plurality of communication routes in said first network;

causing an output edge router that is an edge router connected to said third network and provided at a boundary of said first network to change settings of an Address Resolution Protocol table of said output edge router so as not to transfer a packet addressed to said test destination address to said third network;

first obtaining, as a first number of input packets, a value of an input packet counter from each of routers to be monitored on each of said plurality of communication routes;

generating a test packet including, as a source routing, an address of an input edge router that is an edge router connected to said second network and including, as source and destination addresses, said test source address and said test destination address, and transmitting the generated test packet a predetermined number of times;

second obtaining, as a second number of input packets, a value of said input packet counter from each of said routers to be monitored;

calculating a difference between said first number of input packets and said second number of input packets for each of said plurality of communication routes; and second identifying a communication route through which said test packets passed, based on the calculated differences.

2. The computer-readable storage medium as set forth in claim 1, wherein said first identifying comprises, based on a route presumption table storing, for each combination of source addresses and destination addresses, identification information of said communication route through which said packet transmitted from a first address belonging to said source addresses to a second address belonging to said destination addresses is presumed to pass, identifying said test source address that is anyone of said unused addresses, which are included in said second network and belong to said source addresses relating to a specific combination, and said test destination address that is anyone of said unused addresses, which are included in said third network and belong to said destination addresses relating to said specific combination; and wherein said process further comprises storing said identification information of said communication route identified at said second identifying in association with said specific combination into said route presumption table.

3. The computer-readable storage medium as set forth in claim 2, further comprising:

generating said route presumption table including all combinations of first groups of said source addresses and second groups of said destination addresses, wherein said first groups of said source addresses and said second group of said destination addresses are formed based on a result of a modulo arithmetic using a number of communication routes through which the packet transmitted from said second network to said third network is presumed to pass.

4. The computer-readable storage medium as set forth in claim 1, wherein said transmitting the generated test packet comprises causing to transmit said test packet whose size is equal to or less than 64 bytes, and wherein said first and second obtaining comprise obtaining, as said value of said input packet counter, a value of a counter for packets whose size is equal to or less than 64 bytes.

5. A method for presuming a communication route in a first network connecting with second and third networks, comprising:

identifying a test source address among unused addresses in said second network and a test destination address among unused addresses in said third network, wherein a packet is presumed to be transmitted from said second network to said third network through a plurality of communication routes in said first network;

causing an output edge router that is an edge router connected to said third network and provided at a boundary of said first network to change settings of an Address Resolution Protocol table of said output edge router so as not to transfer a packet addressed to said test destination address to said third network;

first obtaining, as a first number of input packets, a value of an input packet counter from each of routers to be monitored on each of said plurality of communication routes;

generating a test packet including, as a source routing, an address of an input edge router that is an edge router connected to said second network and including, as source and destination addresses, said test source address and said test destination address, and transmitting the generated test packet a predetermined number of times;

second obtaining, as a second number of input packets, a value of said input packet counter from each of said routers to be monitored;

calculating a difference between said first number of input packets and said second number of input packets for each of said plurality of communication routes; and identifying a communication route through which said test packets passed, based on the calculated differences.

6. A route monitoring apparatus for presuming a communication route in a first network connecting with second and third networks, comprising:

a storage device;

an address determination unit to identify a test source address among unused addresses in said second network and a test destination address among unused addresses in said third network, wherein a packet is presumed to be transmitted from said second network to said third network through a plurality of communication routes in said first network;

a table controller to cause an output edge router that is an edge router connected to said third network and provided at a boundary of said first network to change settings of an Address Resolution Protocol table of said output edge router so as not to transfer a packet addressed to said test destination address to said third network;

an obtaining unit to obtain, as a first number of input packets, a value of an input packet counter from each of routers to be monitored on each of said plurality of communication routes, and store said first number of input packets into said storage device; and a test packet transmitter to generate a test packet including, as a source routing, an address of an input edge router that is an edge router connected to said second network and including, as source and destination addresses, said test source address and said test destination address, and to transmit the generated test packet a predetermined number of times, and wherein, after said test packet transmitter transmitted the generated test packet, said obtaining unit obtains, as a second number of input packets, a value of said input packet counter from each of said routers to be monitored, and store said second number of input packets into said storage device, and said route monitoring apparatus further comprises:

a communication route identifying unit to calculate a difference between said first number of input packets and said second number of input packets, which are stored in said storage device, for each of said plurality of communication routes, and to identify a communication route through which said test packets passed, based on the calculated differences.

* * * * *